United States Patent [19]

Takahashi et al.

[11] Patent Number: 5,235,877
[45] Date of Patent: Aug. 17, 1993

[54] SHIFT CONTROL APPARATUS FOR AUTOMATIC TRANSMISSION

[75] Inventors: Tokuyuki Takahashi, Owariasahi; Yasunari Nakamura, Nagoya; Kagenori Fukumura, Toyota; Kohjiroh Kuramochi, Okazaki; Seitoku Kubo, Toyota; Takashi Ohta, Toyota; Yoshihiro Iijima, Toyota; Daisuke Inoue, Toyota, all of Japan

[73] Assignee: Toyota Jidosha Kabushiki Kaisha, Toyota, Japan

[21] Appl. No.: 842,974

[22] Filed: Feb. 28, 1992

[30] Foreign Application Priority Data

Feb. 28, 1991 [JP] Japan ................................. 3-57760
Apr. 2, 1991 [JP] Japan ................................. 3-96384
Apr. 2, 1991 [JP] Japan ................................. 3-96385
Apr. 2, 1991 [JP] Japan ................................. 3-96386

[51] Int. Cl.$^5$ ............................................. F16H 3/44
[52] U.S. Cl. ........................................ 74/866; 475/281
[58] Field of Search ........................... 74/866; 475/281

[56] References Cited

U.S. PATENT DOCUMENTS

| | | | |
|---|---|---|---|
| 4,872,376 | 10/1989 | Asada et al. ......................... | 475/281 |
| 4,944,719 | 7/1990 | Takahashi et al. .................. | 475/281 |
| 4,982,624 | 1/1991 | Takada et al. ....................... | 74/869 |
| 5,010,787 | 4/1991 | Takada et al. ....................... | 74/867 |
| 5,033,331 | 7/1991 | Takada et al. ....................... | 74/867 |
| 5,088,354 | 2/1992 | Asada ..................................... | 74/866 |
| 5,097,723 | 3/1992 | Hayasaki .............................. | 74/866 |
| 5,097,726 | 3/1992 | Asada ..................................... | 74/866 |
| 5,099,718 | 3/1992 | Asada et al. ..................... | 475/281 X |
| 5,113,722 | 5/1992 | Iizuka ..................................... | 74/866 |

FOREIGN PATENT DOCUMENTS 2-80850  3/1990  Japan .

Primary Examiner—Dirk Wright
Attorney, Agent, or Firm—Oblon, Spivak, McClelland, Maier & Neustadt

[57] ABSTRACT

A shift control apparatus for an automatic transmission including a gear train having a plurality of one-way clutches having their engagement states switched in accordance with torque applying directions and a plurality of frictional engagement units adapted to be engaged by oil pressures. The apparatus comprises a controller for engaging a first one of the frictional engagement units so as to maintain a predetermined gear stage after any of the one-way clutches has been engaged or released, if a predetermined condition is satisfied after the one-way clutch has been engaged or released to start a shift to the predetermined gear stage.

28 Claims, 19 Drawing Sheets

| SHIFT POSITION | | SOL | | CLUTCH | | | | BRAKE | | O.W.C | |
|---|---|---|---|---|---|---|---|---|---|---|---|
| | | 90 | 91 | C1 | C2 | C3 | C4 | B1 | B2 | F1 | F2 |
| P | | — | — | | | | | | | | |
| R | | — | — | | | ○ | | | ○ | | |
| N | | — | — | | | | | | | | |
| D | 1ST | ○ | ○ | ○ | | | | | | △ | △ |
| | 2ND | ○ | × | ○ | | | ○ | | | | △ |
| | 3RD | × | × | ○ | ○ | | ○ | | | △ | |
| | 4TH | × | ○ | | ○ | | ○ | ○ | | | |
| S | 1ST | ○ | ○ | ○ | | | | | | △ | △ |
| | 2ND | ○ | × | ○ | | | ○ | ○ | | | ○ |
| | 3RD | × | × | ○ | ○ | | ○ | | | ○ | |
| | (3RD) | × | × | ○ | ○ | | ○ | | | ○ | |
| L | 1ST | ○ | ○ | ○ | | | | | ○ | ○ | ○ |
| | 2ND | ○ | × | ○ | | | ○ | ○ | | | ○ |
| | (3RD) | × | × | ○ | ○ | | ○ | | | ○ | |

FIG. 13

| SoL | | ENGAGED ELEMENT | GEAR STAGE | |
|---|---|---|---|---|
| 91 | 92 | | DRIVING | DRIVEN |
| × | × | C1, C2, C4 | 3RD | 3RD |
| × | ○ | C1, C2, C4 | 3RD | 3RD |
| ○ | ○ | C2, C4 | 3RD(F1 ENGAGED) | 4TH(F2 ENGAGED) |
| ○ | × | C2, C4, B1 | 4TH | 4TH |

|     | $C_1$ | $C_2$ | $C_3$ | $C_4$ | $B_1$ | $B_2$ | $F_1$ | $F_2$ |
|-----|-------|-------|-------|-------|-------|-------|-------|-------|
| 1ST | ○     |       |       |       |       | ◉     | ○     | ○     |
| 2ND | ○     |       |       | ○     | ◉     |       |       | ○     |
| 3RD | ○     | ○     |       | ○     |       |       | ○     |       |
| 4TH |       | ○     |       | ○     | ○     |       |       |       |
| REV |       |       | ○     |       |       | ○     |       |       |

SHIFT CONTROL APPARATUS FOR AUTOMATIC TRANSMISSION

BACKGROUND OF THE INVENTION

The present invention relates to an apparatus for controlling shifts in an automatic transmission.

An automatic transmission for vehicles generally effects shifts by switching the engaged/released states of frictional engagement units such as clutches or brakes in accordance with changes in running conditions such as a vehicle speed or a degree of throttle opening. Moreover, one-way clutches are used to facilitate shift controls and smoothen the shifts.

One example of the automatic transmission of this kind is shown in skeleton diagram in FIG. 19. This automatic transmission is disclosed in Japanese Patent Laid-Open No. 4742/1989 and equipped with two sets of planetary gear mechanisms, a plurality of frictional engagement units and a pair of one-way clutches arrayed in series with each other. Specifically, a carrier 3 of a first planetary gear mechanism 1 and a ring gear 4 of a second planetary gear mechanism 2 are connected to each other, and a ring gear 5 of the first planetary gear mechanism 1 and a carrier 6 of the second planetary gear mechanism 2 are connected to each other. Moreover, an input shaft 7 is arranged along the center axis of those planetary gear mechanisms 1 and 2. A first clutch C1 is interposed between the input shaft 7 and a sun gear 8 of the first planetary gear mechanism 1, and a second clutch C2 is interposed between the input shaft 7 and the carrier 6 of the second planetary gear mechanism 2. A third clutch C3 is interposed between the input shaft 7 and a sun gear 9 of the second planetary gear mechanism 2. Between the carrier 6 and the sun gear 9 of the second planetary gear mechanism 2, on the other hand, there are interposed a fourth clutch C4 and a first one-way clutch F1, which are arrayed in series with each other. The first one-way clutch F1 is engaged if the rotating direction of the clutch drum of the fourth clutch C4, i.e., the rotating direction of the sun gear 8 with the fourth clutch C4 being engaged is forward (i.e., in the same direction as that of the input shaft 7) with respect to the carrier 6. Between the clutch drum of the fourth clutch C4 and a casing 10, there is interposed a second one-way clutch F2 which is engaged when the clutch drum is rotated backward (i.e., in the direction opposite to that of the input shaft 7).

On the other hand, the brake means is exemplified by both a first brake B1, i.e., a band brake fixed on the outer circumference of the clutch drum of the fourth clutch C4 and a second brake B2 for braking the rotations of the ring gear 5 of the first planetary gear mechanism 1 and the carrier 6 of the second planetary gear mechanism 2, which are connected to each other. Thus, the first brake B1 stops the rotations of the carrier 6 and the sun gear 9 of the second planetary gear mechanism 2 selectively through the fourth clutch C4 or the first one-way clutch F1.

In the gear train shown in FIG. 19, individual gear stages of four forward and one reverse stages are set by engaging the engagement units such as the clutches and/or brakes in combinations, as shown in FIG. 20. In FIG. 20: symbols ◯ indicate the engaged states; symbols ⊙ indicate the engaged states to be taken at the time of engine braking; and blanks indicate the released states.

The automatic transmission equipped with the gear train shown in FIG. 19 ordinarily performs an upshift from 2nd to 3rd speeds, for example, in the following manner. An electronic control type automatic transmission is equipped with a shift diagram using the throttle opening and the vehicle speed as parameters so that a shift signal is outputted to engage the second clutch C2 at the instant when the throttle opening and the vehicle speed vary to cause the running state to cross the 2-3 shift curve.

This upshift is established in either the so-called "power-on upshift", in which the throttle opening or the engine output is increased to accelerate the vehicle speed, or the so-called "power-off upshift" in which the throttle opening is decreased to lower the engine output. If, at the time of the latter power-off upshift, the shift signal is outputted to engage the second clutch C2 simultaneously as the change in the running state from the 2nd to 3rd speeds is detected, an inertial torque is established to give the passenger a discomfort.

In the example shown in FIG. 19, the 2nd speed is set by engaging the first clutch C1 and the fourth clutch C4 and accordingly by engaging the second one-way clutch F1. In this state, the sun gear 8 of the first planetary gear mechanism 1 rotates together with the input shaft 7, while the sun gear 9 of the second planetary gear mechanism 2 being fixed, so that the carrier 3 of the first planetary gear mechanism 1 and the ring gear 4 of the second planetary gear mechanism 2 rotate integrally with the drive gear 11 or the output member at a lower speed than the input shaft 7. And, the carrier 6 of the second planetary gear mechanism 2 and the ring gear 5 of the first planetary gear mechanism 1 connected to the second clutch C2 rotate at a lower speed than the drive gear 11.

If the second clutch C2 is engaged immediately after the decision of the shift to the 3rd speed at the 2nd speed state, the ring gear 5 of the first planetary gear mechanism 1 and the carrier 6 of the second planetary gear mechanism 2 are abruptly accelerated from their forward low speeds to a speed equal to that of the input shaft 7. This abrupt acceleration appears as a positive torque in the accelerating direction on the output shaft so that a torque in the opposite direction that of the expected torque is temporarily established and felt as the discomfort at the time of a deceleration (or power-off) in which the throttle opening is decreased. In other words, the shift shocks are deteriorated.

These phenomena are illustrated in FIG. 21. If an upshift from the 2nd to 3rd speeds is decided at an instant $t_0$ while the vehicle is running at the 2nd speed and if a predetermined solenoid valve is switched, the torque capacity begins to be built up in the second clutch C2 at an instant $t_1$ which is inevitably delayed. Since, at this instant, the engine speed (more specifically, turbine speed) is not sufficiently decreased yet, a positive torque appears to cause the passenger feel the shift shocks. Thus, the turbine speed is decreased as a result of such increase in the load, and the output torque drops to a negative value at an instant $t_2$.

In order to decrease the shift shocks, on the other hand, the switching timings of engagements/releases of the frictional engagement units are controlled in the prior art in accordance with the drive state of the engine. This control is exemplified in Japanese Patent Laid-Open No. 76967/1990 by a shift control apparatus in which the clutch engaging rates for a downshift causing the rotating members connected to the input shaft to change are made different for the driving (or power-on) time and the driven (or power-off) time. Specifically, the engaging rate is increased at the power-on downshift time by feeding an oil pressure to the clutches through two orifices having larger and smaller effective areas but is decreased at the power-off downshift time by feeding an oil pressure to the clutches only through the orifice having the smaller effective area. As a result, the shifting timing reflects the drive state of the engine so that the shift shocks can be softened.

In the apparatus disclosed in Japanese Patent Laid-Open No. 76967/1990, however, the timings for engaging the clutches at the downshift time can be changed, but their controls are carried out by changing the orifices for passing the oil pressure. As a result, the control range is not wide but may fail to match the actual running condition. Specifically, the running states at the time of a shift such as the engine output, the running speed, the viscosity of oil or the gear stage to be set are remarkably various, and the control of switching the oil pressure passing orifices between only two kinds is difficult to optimum the engaging or releasing timings of the frictional engagement units for all the running conditions. At the power-on downshift time, for example, the timings for engaging the frictional engagement units may possibly be so premature as to establish a negative output torque, which will be felt as the shift shocks.

SUMMARY OF THE INVENTION

An object of the present invention is to decrease the shift shocks by deciding and optimizing the timings for engaging the frictional engagement units according to conditions matching the advance of a shift.

Another object of the present invention is to smoothen a shift by making effective use of one-way clutches.

Still another object of the present invention is to prevent the shift shocks, which might otherwise be caused as a result of the fact that two frictional engagement units have transmission torque capacities equal to or higher than a predetermined value, when a shift is to be executed by actuating the two frictional engagement units in opposite directions.

A further object of the present invention is to ensure a fail-safe situation.

According to the present invention, there is provided a shift control apparatus for an automatic transmission including a gear train having a plurality of one-way clutches having their engagement states switched in accordance with torque applying directions and a plurality of frictional engagement units adapted to be engaged by oil pressures, the apparatus comprising control means for engaging a first one of the frictional engagement units so as to maintain a predetermined gear stage after any of the one-way clutches has been engaged or released, if a predetermined condition is satisfied after the one-way clutch has been engaged or released to start a shift to the predetermined gear stage. Since the one-way clutches have their engaged states switched in accordance with the direction in which the torques are applied, a shift has advanced already at the instant when the engaging or releasing operations are started. Thus, even if the frictional engagement units are then engaged to transmit the torques positively, the output torques are not fluctuated abruptly and excessively so that the shift shocks are not deteriorated.

Moreover, the predetermined gear stage is maintained by engaging the frictional engagement units.

In the present invention, the conditions to be adopted for engaging the frictional engagement units are exemplified by the rotational speed of a predetermined rotating member, the ratio between an input speed and an output speed or the lapse of a predetermined time period. Thus, the shift control apparatus of the present invention is equipped with decision means for deciding the satisfaction of those conditions.

Moreover, the shift control apparatus of the present invention comprises: a shift valve for feeding an oil pressure to one of two frictional engagement units to take part in the shift and for establishing communication of the other frictional engagement unit with a drain; and a control valve interposed between the shift valve and either of said frictional engagement units for feeding and releasing the oil pressure to and from the same frictional engagement unit. Thus, the feeding and releasing states of the oil pressure to and from the two frictional engagement units are simultaneously switched by the shift valve. As to the frictional engagement unit having the interposed control valve, however, the switching of the feeding/releasing or engaged/released states is independently controlled by that control valve. As a result, the so-called "double lock" and accordingly the shocks, which might otherwise result from the fact that both the two frictional engagement units have torque capacities higher than a constant value, are prevented by advancing or delaying the timing for engaging or releasing one of the frictional engagement units.

Moreover, by providing communication of the drain port of the control valve directly, i.e., not through the drain with the oil passage which is to be fed with the oil pressure when another gear stage is to be set, the frictional engagement units, to and from which the feed and release the oil pressure are controlled by the control valve, can be engaged and released like in a normal state to set a predetermined gear stage even when the control valve or a solenoid valve for actuating the former valve fails.

The above and further objects and novel features of the present invention will more full appear from the following detailed description when the same is read in connection with the accompanying drawings. It is to be expressly understood, however, that the drawings are for the purpose of illustration and not intended as a definition of the limits of the invention.

BRIEF DESCRIPTION OF THE DRAWINGS

FIG. 13 is a chart showing both the combinations of ON/OFF of first and second solenoid valves and the elements to be engaged for setting the 3rd speed and the 4th speed;

DETAILED DESCRIPTION OF THE PREFERRED EMBODIMENTS

Figure 1:
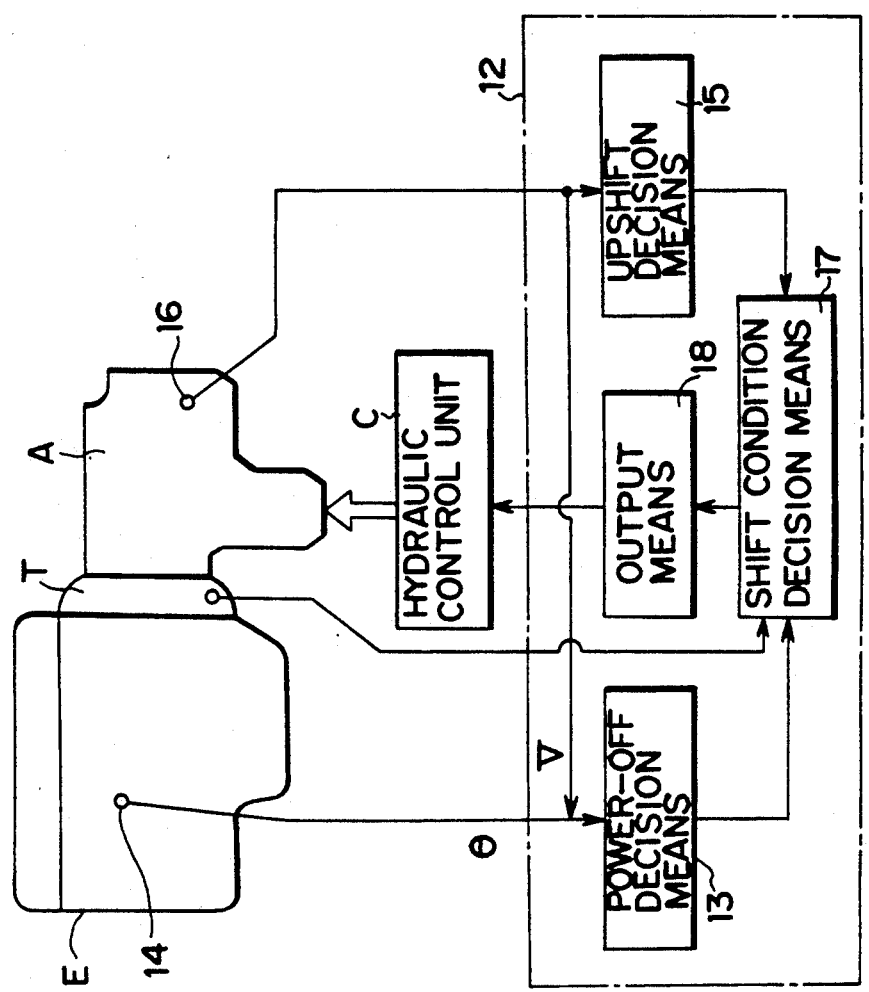
FIG. 1 is a block diagram showing one embodiment of the present invention schematically.

FIG. 1 is a block diagram showing one embodiment which is constructed to be suited for a power-off upshift.

An automatic transmission A is connected to an engine E through a torque converter T. The automatic transmission A is equipped with a gear train, which is exemplified in FIG. 19, and is set to a plurality of gear stages by engaging/releasing frictional engagement units such as clutches and/or brakes with an oil pressure which is fed/released by a hydraulic control unit C controlled electrically like that used currently in the prior art. There is also provided an electronic control unit (ECU) 12 for outputting a shift signal to the hydraulic control unit C.

The electronic control unit 12 is composed mainly of arithmetic elements, memory elements and an interface, as is functionally shown in FIG. 1. Specifically, power-off decision means 13 outputs a signal by detecting either a decrease in the degree of throttle opening $\theta$ inputted from a throttle opening sensor 14 of the engine E or a decrease (i.e., power-off) in the engine output from the actual throttle opening $\theta$. On the other hand, an upshift decision means 15 outputs a signal by deciding that the running state of a vehicle is to be shifted up, on the basis of a vehicle speed signal V outputted from a vehicle speed sensor 16 built in the automatic transmission A, the throttle opening signal $\theta$, and a shift map stored in advance. Moreover, shift condition decision means 17 decides whether or not the conditions decided by the upshift decision means 15 for actuating predetermined frictional engagement units so as to hold a gear stage after the upshift has been held. The conditions to be adopted can be exemplified by the fact that the ratio between the speed of an output member and the speed of a turbine in the torque converter T takes a predetermined value near the gear ratio after the upshift or that a predetermined set time has elapsed. Still moreover, output means 18 outputs a signal to the hydraulic control unit C so the predetermined frictional engagement units may be actuated to hold the gear stage after the upshift.

Figure 2:
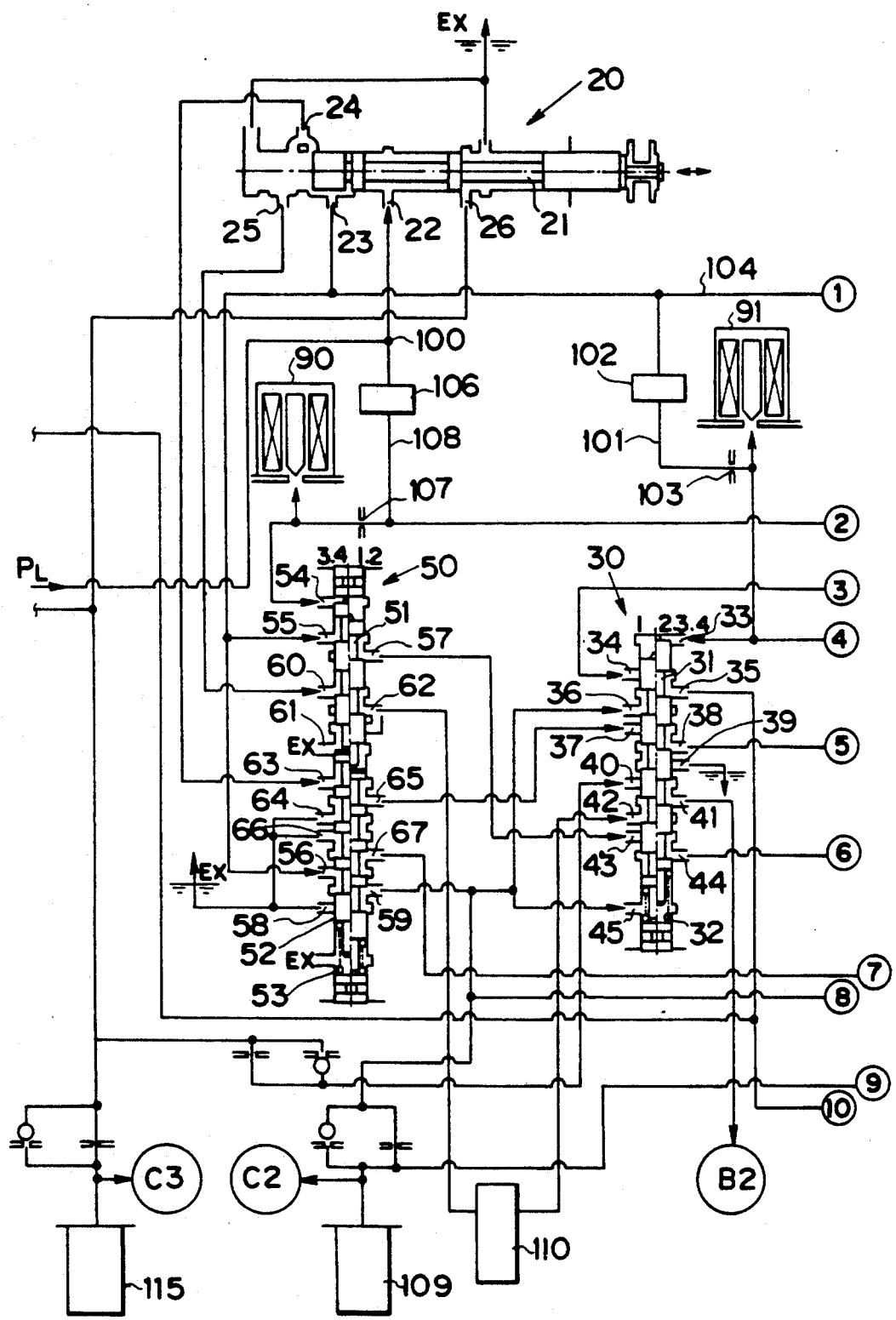
FIG. 2 is an oil pressure circuit diagram showing a portion of an oil pressure circuit according to the present invention.
Figure 3:
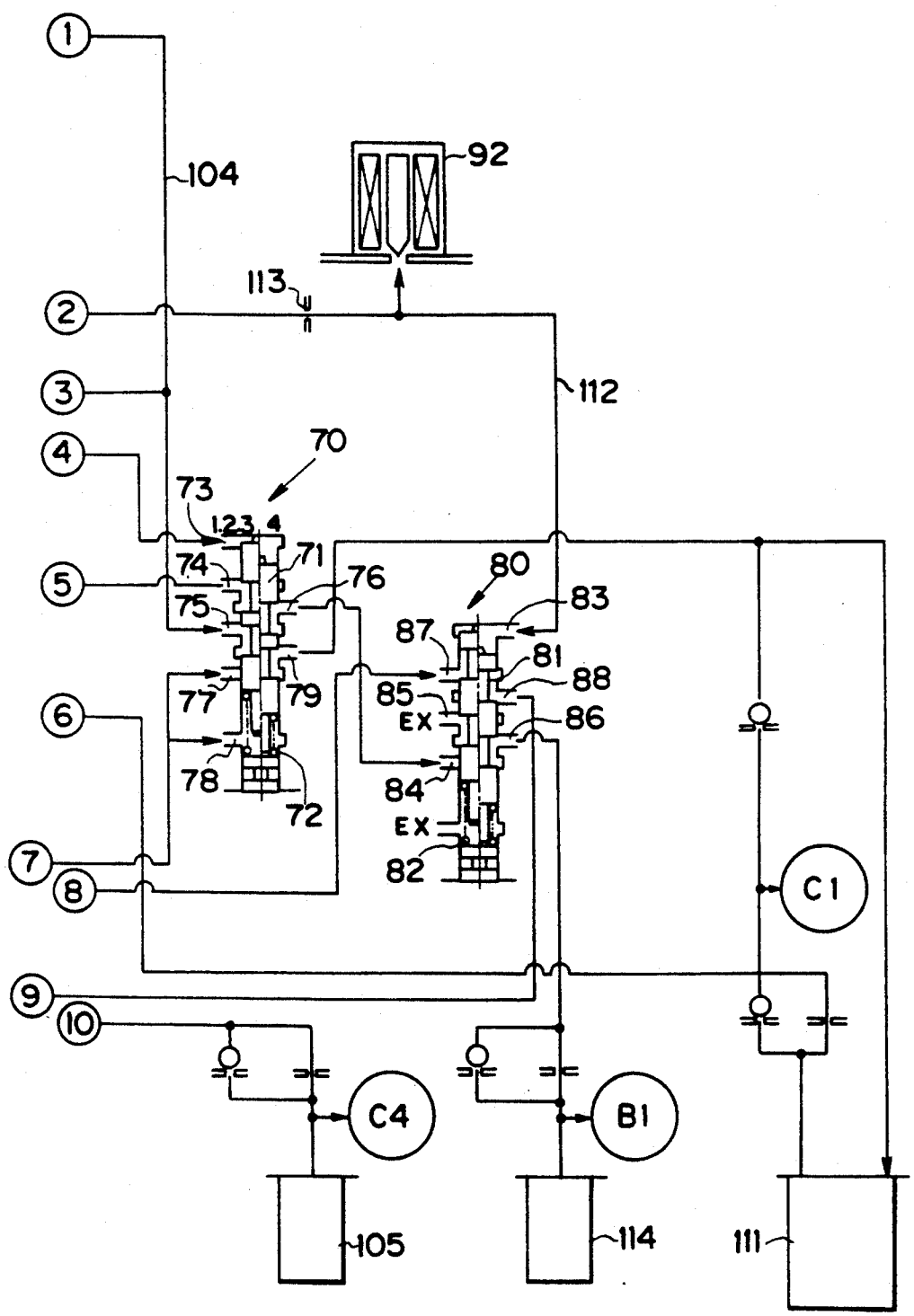
FIG. 3 is an oil pressure circuit diagram showing the remaining portion of the oil pressure circuit.

FIGS. 2 and 3 are oil pressure circuit diagrams showing one example of the aforementioned hydraulic control unit C. From these Figures, an oil pump, means for regulating the oil pressure generated by the oil pump to a line pressure $P_L$, means for controlling a lockup clutch, means for controlling an accumulator back pressure are omitted because they can be exemplified by those known in the prior art. In FIGS. 2 and 3, moreover, circled reference numerals indicate the connected portions indicated by the same numerals without the circles.

In order to set the aforementioned individual gear stages by controlling the oil pressure to first to fourth clutches C1, C2, C3 and C4 and first and second brakes B1 and B2 of the foregoing gear train, the hydraulic control unit shown in FIGS. 2 and 3 is equipped with a manual value 20, a 1-2 shift valve 30, a 2-3 shift valve 50, a 3-4 shift valve 70, a B1 control valve 80, and solenoid valves 90, 91 and 92 for controlling the shift valves 30, 50 and 70, respectively.

The manual valve 20 is manually actuated like that of the prior art to select a P (Parking) range, an R (Reverse) range, an N (Neutral) range, a D (Drive) range, an S range and an L range. If the D range is selected, a spool 21 is moved leftward from the shown position to establish communication of an input port 22 connected to a line pressure oil passage 100 with a D port 23. If the S range is selected, the spool 21 is further moved leftward of the drawing to establish communication of the input port 22 with the D port 23 and an S port 24. If the L range is selected, the spool 21 is moved to the left-hand end of the drawing to establish communication of the input port 22 with the D port 23, the S port 24 and an L port 25. If the R range is selected, on the other hand, the spool 21 is moved rightward from the shown position to establish communication of the input port 22 with only an R port 26. Moreover, if the N range is selected, the spool 21 is in the shown position, the communication of the input port 22 with another port is blocked. If the P range is selected, the input port 22 is closed by the spool 21.

The 1-2 shift valve 30 includes a spool 31 formed with five lands and a spring 32 for pushing the spool 31 in one direction (i.e., upward of the drawing). The 1-2 shift valve 30 is formed with a control port 33 which is located at the end opposite to that arranged with that spring 32. The control valve 33 is given communication with the D port 23 of the manual valve 20 via an oil passage 101. In this oil passage 101, there is disposed through a strainer 102 and an orifice 103 the second solenoid valve 91 for releasing the pressure from the oil passage 101, when it is OFF, and establishing the line pressure $P_L$ in the oil passage 101 when it is ON. Moreover, a first D port 34 in the 1-2 shift valve 30 is given communication with the D port 23 of the manual valve 20 via an oil passage 104 bypassing the strainer 102 and the second solenoid valve 91. The fourth clutch C4 is connected to a clutch port 35 which communicates with the D port 34 when the spool 31 is held in the position shown at the righthand of the drawing by the urging force of the spring 32. Incidentally, the fourth clutch C4 is equipped with an accumulator 105.

The 1-2 shift valve 30 is further formed, as recited from the upstream in the shown state, with a second D port 36 to be given selective communication with the clutch port 35, an S port 37, a brake port 38, a drain port 39, an R port 40, a brake port 41, an L port 42, a third D port 43, a clutch port 44 and a hold port 45. Of these, the brake port 41 is connected to the second brake B2.

On the other hand, the 2-3 shift valve 50 includes two spools 51 and 52 arrayed in series on a common axis, and a spring 53 for pushing those spools 51 and 52 in one direction (i.e., upward of the drawing). A control port 54 is formed at the end opposite to the end arranged with the spring 53 and is connected to an oil passage 108 which is branched from the line pressure oil passage 100 and is equipped with a strainer 106, an orifice 107 and the first solenoid valve 90. As a result, the control port 54 releases the pressure, if the first solenoid valve 90 is OFF, so that the spools 51 and 52 are urged to the positions shown at the lefthand of the drawing by the spring 53. If the first solenoid valve 90 is ON, on the contrary, the line pressure $P_L$ acts upon the control port 54 so that the spools 51 and 52 are pushed down to the positions shown at the righthand of the drawing.

Moreover, the 2-3 shift valve 50 is formed with first and second D ports 55 and 56 which are connected to the D port 23 of the manual valve 20. A clutch port 57 is permitted or forbidden to communicate with the first D port 55 and is connected to the third D port 43 in the 1-2 shift valve 30. A clutch port 59 is given selective communication with the second D port 56 and a drain port 58 and is connected to the second D port 36 and the hold port 45 in the 1-2 shift valve 30. On the other hand, the clutch port 59 is connected to the second clutch C2. Incidentally, reference numeral 109 designates an accumulator.

Still moreover, the 2-3 shift valve 50 is formed with an L port 60 which is connected to the L port 25 of the manual valve 20. A brake port 62 is given selective communication with the L port 60 and a drain port 61 and is connected to the L port 42 of the 1-2 shift valve 30 through a low-cost modulator valve 110. Here, this low-cost modulator valve 110 is used to lighten the shift shocks at the time of a shift to the L range and can be exemplified by one used currently in the prior art. The 2-3 shift valve 50 is formed with an S port connected to the S port 24 of the manual valve 20. A brake port 65 to be given selective communication with the S port 63 and a drain port 64 is connected to the S port 37 in the 1-2 shift valve 30. Further formed is a clutch port 67 which is given selective communication with the second D port 56 and another drain port 66.

The 3-4 shift valve 70 is provided for simultaneously switching the feed and release of the release valve to and from the two engagement elements of the first clutch C1 and the first brake B1 and is equipped with a spool 71 formed with three lands and a spring 72 for urging the spool 71 in one direction (i.e., upward of the drawing). A control port 73 formed at the end opposite to the end arranged with the spring 72 is connected to the control port 33 in the 1-2 shift valve 30 so that the feed and release of the line pressure $P_L$ to the control port 73 of the 3-4 shift valve 70 are effected by the second solenoid valve 91.

Moreover, the 3-4 shift valve 70 is formed with an S port 74 connected to the brake port 38 in the 1-2 shift valve 30. Further formed is a brake port 76 which is given selective communication with that S port 74 and a first D port 75 connected to the D port 23 of the manual valve 20 via the aforementioned oil passage 104. Further formed are a second D port 77 and a hold port 78 which are connected to the clutch port 67 in the aforementioned 2-3 shift valve 50. The first clutch C1 is connected to a clutch port 79 which is given selective communication with those first D port 75 and second D port 77. The first clutch C1 is fed with the oil pressure from the clutch port 79 through an accumulator 111.

Incidentally, the first clutch C1 is further connected with the clutch port 44 in the aforementioned 1-2 shift valve 30.

Downstream of the 3-4 shift valve 70, i.e., downstream of the feed of the oil pressure from the 3-4 shift valve 79 to the first brake B1, there is arranged the B1 control valve 80. This B1 control valve 80 is provided, as so named, for controlling the oil pressure to be fed from the 3-4 shift valve 70 to the first brake B1 and is equipped with a spool 81 having three lands and a spring 82 for urging the spool 81 in one direction (i.e., upward of the drawing). A control port 83 formed at the end opposite to the end arranged with the spring 82 is connected to an oil passage 112 which is branched from the aforementioned oil passage 108 at the downstream of the strainer 106. The oil passage 112 is equipped therein with an orifice 113 and the normally closed solenoid valve (which is tentatively called the "fourth solenoid valve"). As a result, if the fourth solenoid valve 92 is OFF, the line pressure $P_L$ acts on the control port 83 so that the spool 81 moves down, as shown at the righthand side of the drawing, against the elastic force of the spring 82. If ON, on the contrary, the line pressure $P_L$ is released from the control port 83 so that the spool 81 is lifted to the position shown at the lefthand of the drawing by the spring action.

The B1 control valve 80 is formed with a first D port 84 connected to the brake port 76 of the 3-4 shift valve 70. The first brake B1 is connected to a brake port 86 which is given selective communication with the first D port 84 and a drain port 85. Incidentally, the first brake B1 is equipped with an accumulator 114. The B1 control valve 80 is further formed with a second D port 87 connected to the clutch port 59 in the aforementioned 2-3 shift valve 50. The second clutch C2 is connected to a clutch port 88 which is permitted and forbidden to communicate with the second D port 87.

Incidentally, in order that the reverse stage may be set if the R range is selected by the manual valve 20, the R port 26 is connected to the third clutch C3 and the R port 40 of the 1-2 shift valve 30. This third clutch C3 is equipped with an accumulator 115.

Figures 4, 5:
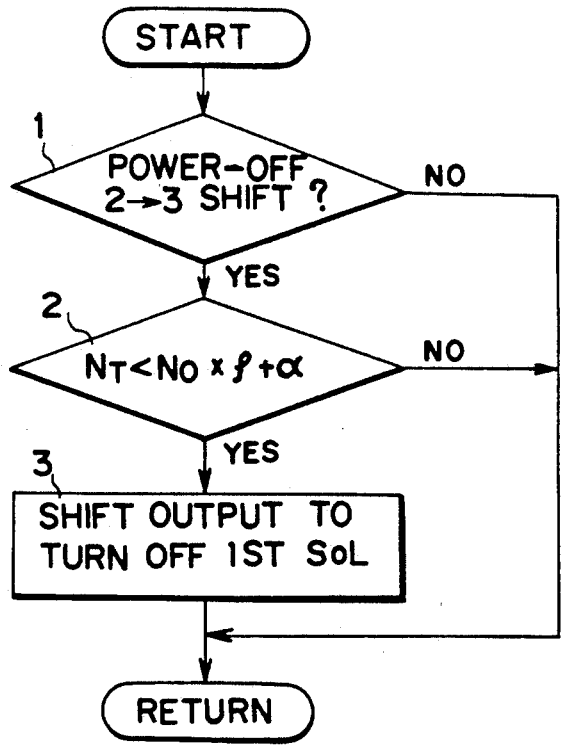
FIG. 4 is a clutch and brake application chart for setting individual gear stages.
FIG. 5 is a flow chart showing a control routine for a power-off upshift from 2nd to 3rd speeds.

The feed and release of the line pressure $P_L$ to the control ports 33, 54 and 73 of the individual shift valves 30, 50 and 70, as shown in FIGS. 2 and 3, are effected by the first solenoid valve 90 or the second solenoid valve 91 so that the individual gear stages of the forward range are set by combining the ON and OFF states of those solenoid valves 90 and 91. The ON and OFF states of those solenoid valves 90 and 91 and the according engaged and released states of the individual engagement elements are shown in FIG. 4. In FIG. 4, symbols ◯ in the column SoL indicate that the solenoid valves are in the ON state, and symbols X indicate that the same are in the OFF state. In the columns of the engagement elements, moreover: symbols ◯ indicate the engaged state; blanks indicate the released state; and symbols Δ indicate the released state to be taken at a coasting time. Incidentally, the parenthesized 3rd speed in FIG. 4 indicates the 3rd speed state when the solenoid valves fail.

Next, the operations of the apparatus thus constructed according to the present invention will be described in the following.

FIG. 5 is a flow chart showing one example of the control procedures for a power-off upshift from the 2nd to 3rd speeds. At the 2nd speed, the first solenoid valve 90 is ON, but the second solenoid valve 91 is OFF. As a result, the 1-2 shift valve 30 has its spool 31 lifted to the position shown at the righthand of the drawing to give the first D port 34 the communication with the clutch port 35 so that the fourth clutch C4 is fed with the oil pressure and engaged. On the other hand, the 3-4 shift valve 70 has its spool 71 lifted to the position shown at the lefthand of the drawing to give the first D port 75 the communication with the clutch port 79 so that the first clutch C1 is fed with the oil pressure and engaged.

In short, the gear train has its first clutch C1, fourth clutch C4 and second one-way clutch F2 engaged to set the 2nd speed.

If, in this state, the throttle valve is fully closed so that the running state accordingly comes into the 3rd speed state determined in the shift diagram, the aforementioned power-off decision means 13 decides that the state is in the power-off, and the upshift decision means 15 decides that the shift is the upshift from the 2nd to 3rd speeds. In other words, the decision result of Step 1 in FIG. 5 is "YES", and it is then decided at Step 2 whether or not the condition for engaging the second clutch C2 to hold the 3rd speed is satisfied. In the example shown in FIG. 5, the condition adopted for engaging the second clutch C2 is that an actual turbine speed $N_T$ takes a value near that at the 3rd speed. At Step 2, therefore, the turbine speed at the 3rd speed is determined from the speed $N_O$ of the drive gear 11 or the output member, the gear ratio $\rho$ at the 3rd speed, and a constant $\alpha$ estimating a predetermined delay. Thus, the satisfaction of the condition is decided if the actual turbine speed $N_T$ drops to a value lower than the determined speed. In short, the decision result is "YES". At Step 3, a shift output, i.e., a signal for turning off the first solenoid valve 90 is outputted.

The satisfaction of the aforementioned condition is decided by the shift condition decision means 17 shown in FIG. 1, and the outputting of the signal to the hydraulic control unit C based on the decision result is carried out by the output means 18.

If the first solenoid valve 90 is turned off in response to the output signal of the output means 18, the 2-3 shift valve 50 shown in FIG. 2 is released from the oil pressure via its control port 54 so that its spools 51 and 52 are lifted to the positions shown at the lefthand of the drawing. As a result, the second D port 56 achieves communication with the clutch port 59 so that the second clutch C2 is engaged to hold the 3rd speed.

The changes in the output torque, the torque capacity of the second clutch C2 and the turbine speed in case of the controls described above are illustrated in FIG. 6. If the throttle valve is fully closed at an instant $t_3$ when the vehicle is running at the 2nd speed, the power-off upshift is decided, but the signal for releasing the second clutch C2 is not outputted. This signal is outputted at an instant $t_4$ when the turbine speed gradually drops together with the output torque until it takes a value estimating a predetermined delay. At a subsequent instant $t_5$, the first one-way clutch F1 is engaged in place of the second one-way clutch F2 so that a negative torque appears in the output torque. At an instant $t_6$ after a predetermined time lag has elapsed from the instant $t_4$, the torque capacity is established in the second clutch C2. Since, at this time, the carrier 6 of the second planetary gear mechanism 2 has reached a speed substantially equal to that of the input shaft 7, neither a temporary positive torque appears in the output torque nor it causes serious shift shocks.

Figure 7:
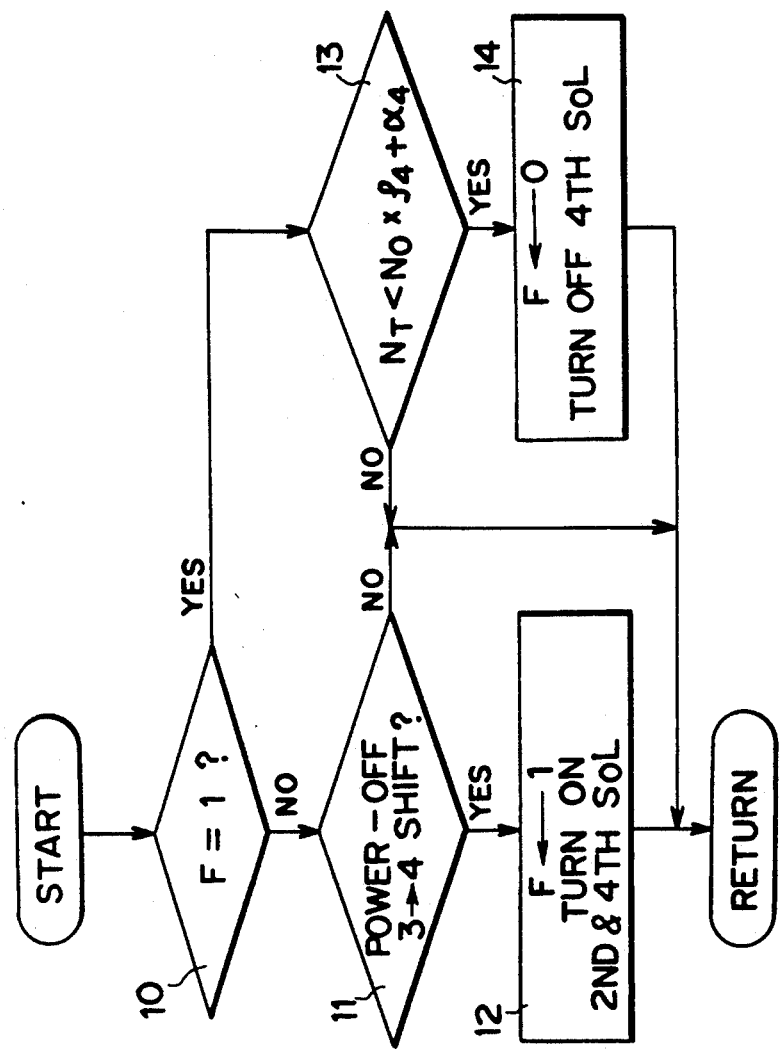
FIG. 7 is a flow chart showing a control routine for a power-off upshift from 3rd to 4th speeds.

FIG. 7 is a flow chart showing a routine for controlling an upshift from the 3rd to 4th speeds at a power-off time by the aforementioned shift control unit. In this control, the first brake B1 is maintained in the released state till the condition is satisfied, namely, till the synchronization is completed.

At Step 10, it is decided whether or not a flag F is at "1". This flag F indicates whether or not the oil pressure is released from the first brake B1 through the B1 control valve 80, and takes a value "1" indicating the release and a value "0" indicating the non-release. In the state of the 3rd speed, therefore, the fourth solenoid valve 92 is OFF so that the spool 81 of the B1 control valve 80 is in the lower position shown at the righthand of the drawing. As a result, the first D port 84 and the brake port 86 communicate with each other so that the flag F takes the value "0". In other words, the decision result of Step 10 is "NO". If, in this state, the throttle valve is fully closed to decide the upshift to the 4th speed, the decision result of Step 11 is "YES". At this time, the second solenoid valve 91 is turned on to execute the shift from the 3rd to 4th speeds. Simultaneously with this, the fourth solenoid valve 92 is turned on (at Step 12). Moreover, the flag F is set to "1". As a result, the 3-4 shift valve 70 has its control port 73 subjected to the line pressure $P_L$ to have its spool 71 lowered to the position shown at the righthand of the drawing so that the clutch port 79 communicates with the second D port 77 whereas the first D port 75 communicates with the brake port 76. Since, in this case, the clutch port 67 of the 2-3 shift valve 50 connected to the second D port 77 is given communication with the drain port 66, the first clutch C1 is released from the oil pressure and disengaged. Moreover, the oil pressure is fed out via the first D port 75 and the brake port 76 of the 3-4 shift valve 70, but the fourth solenoid valve 92 in the B1 control valve 80 is turned on to release the oil pressure from the control port 83 so that the spool 81 is lifted to the position shown at the lefthand of the drawing to close the first D port 84. Moreover, the brake port 86 connected to the first brake B1 is given communication with the drain port 85 so that the first brake B1 is maintained in the released state.

After these controls, the routine returns to Step 10. Then, the flag F is at "1" so that the routine advances to Step 13 for deciding the synchronization. This is similar to the deciding procedures of Step 2 of the control routine shown in FIG. 5. If, in the state of the 3rd speed, the throttle opening is limited whereas the first clutch C1 is released, the rotational speed of the carrier 6 in the second planetary gear mechanism 2 drops relative to that of the ring gear 4 so that the rotational speed of the sun gear 9 is gradually decelerated. This situation can be decided by comparing the value, which is determined the speed $N_O$ of the drive gear 11 or the output member, the gear ratio $\rho_4$ at the 4th speed and a predetermined constant $\alpha_4$, with the actual turbine speed $N_T$. Thus, ON state of the fourth solenoid valve 92 is maintained till the decision result at Step 13 shown in FIG. 7 becomes "YES". If this decision result is "YES", the routine advances to Step 14, at which the fourth solenoid valve 92 is turned off. Simultaneously with this, the flag F is set to "0".

As a result, the B1 control valve 80 has its control port 83 subjected to the line pressure $P_L$ to have its spool 81 lowered to the position shown at the righthand of the drawing so that its first D port 84 communicates with the brake port 86. As a result, the first brake B1 is fed with the oil pressure and is engaged. In short, the 4th speed state is established. Since, at this time, the speed of the sun gear 9 of the second planetary gear mechanism 2 is substantially zero, no positive torque appears in the output torque so that the shift shocks are not deteriorated, even if the sun gear 9 is fixed by the first brake B1.

Figure 8:
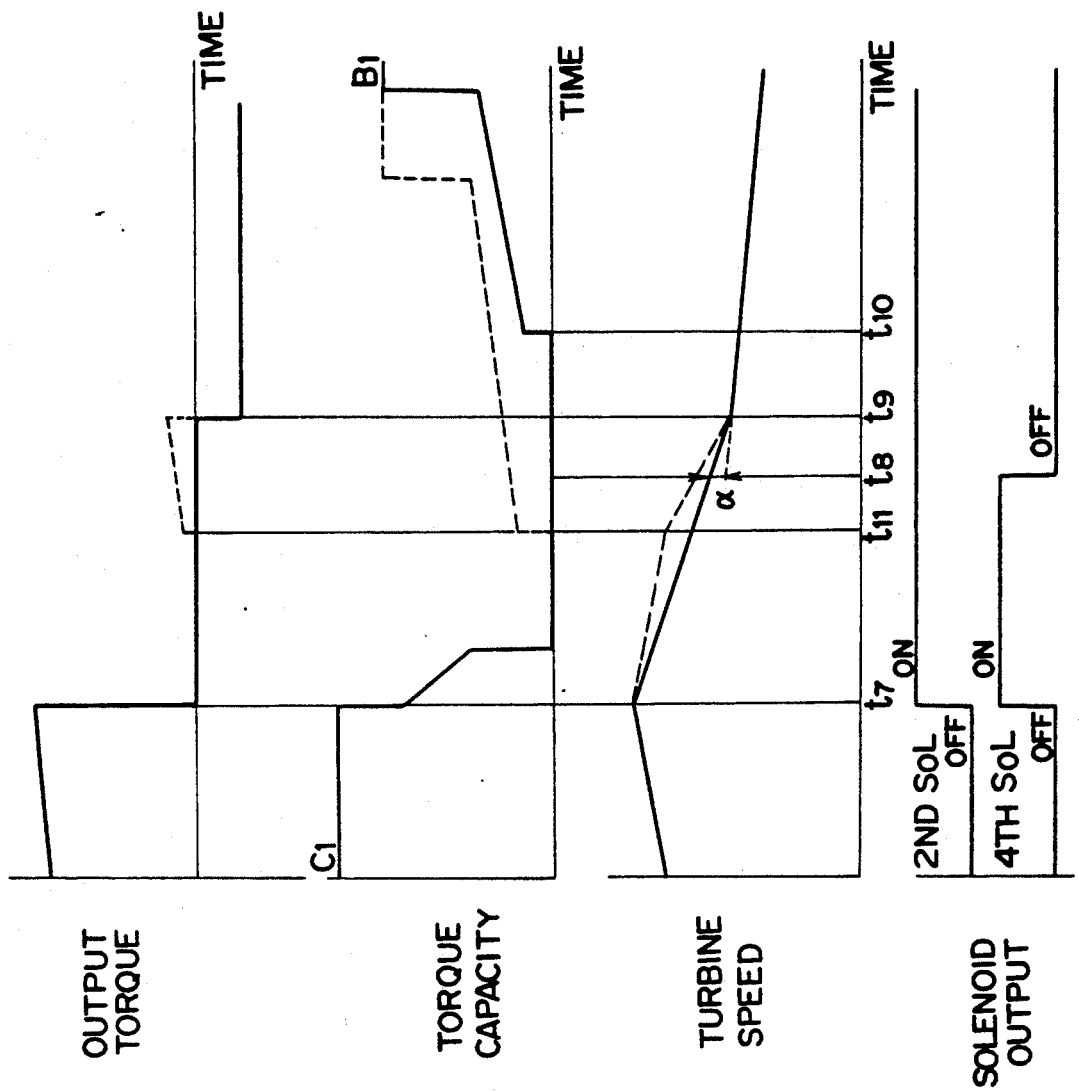
FIG. 8 is a time chart showing time changes in the output torque, the torque capacity of a first clutch, the turbine speed and the solenoid output at the time of the shift.

The changes in the output torque in the upshift from the 3rd to 4th speeds at the aforementioned power-off time, the torque capacities of the first clutch C1 and the first brake B1, the turbine speed, and the ON/OFF of the second and fourth solenoid valves 91 and 92 are illustrated in FIG. 8.

If the throttle valve is fully closed at an instant $t_7$ while the vehicle is running at the 3rd speed, the second and fourth solenoid valves 91 and 92 are turned on so that the first clutch C1 is released at first from the oil pressure. As a result, the synchronization is decided (at an instant $t_8$) from the fact that the first clutch C1 loses most of the torque capacity and that the turbine speed sufficiently drops. Then, the fourth solenoid valve 92 is turned off. At a subsequent instant $t_9$ after a predetermined time period has elapsed, the negative torque appears in the output torque. As the driving state, more specifically, no positive torque appears in the output torque from an instant ($t_{10}$), at which the first brake B1 is engaged, after the 4th speed.

If, on the contrary, the switching control of not only the first clutch C1 but also the first brake B1 is instructed simultaneously with the shift decision at the instant $t_7$, the torque capacity of the first brake B1 appears before the synchronized state (at an instant $t_{11}$), as indicated by dash lines in FIG. 8, to stop rotation of the sun gear 9 of the second planetary gear mechanism 2 forcibly so that the positive torque appears in the output torque to cause the shift shocks.

Figure 6:
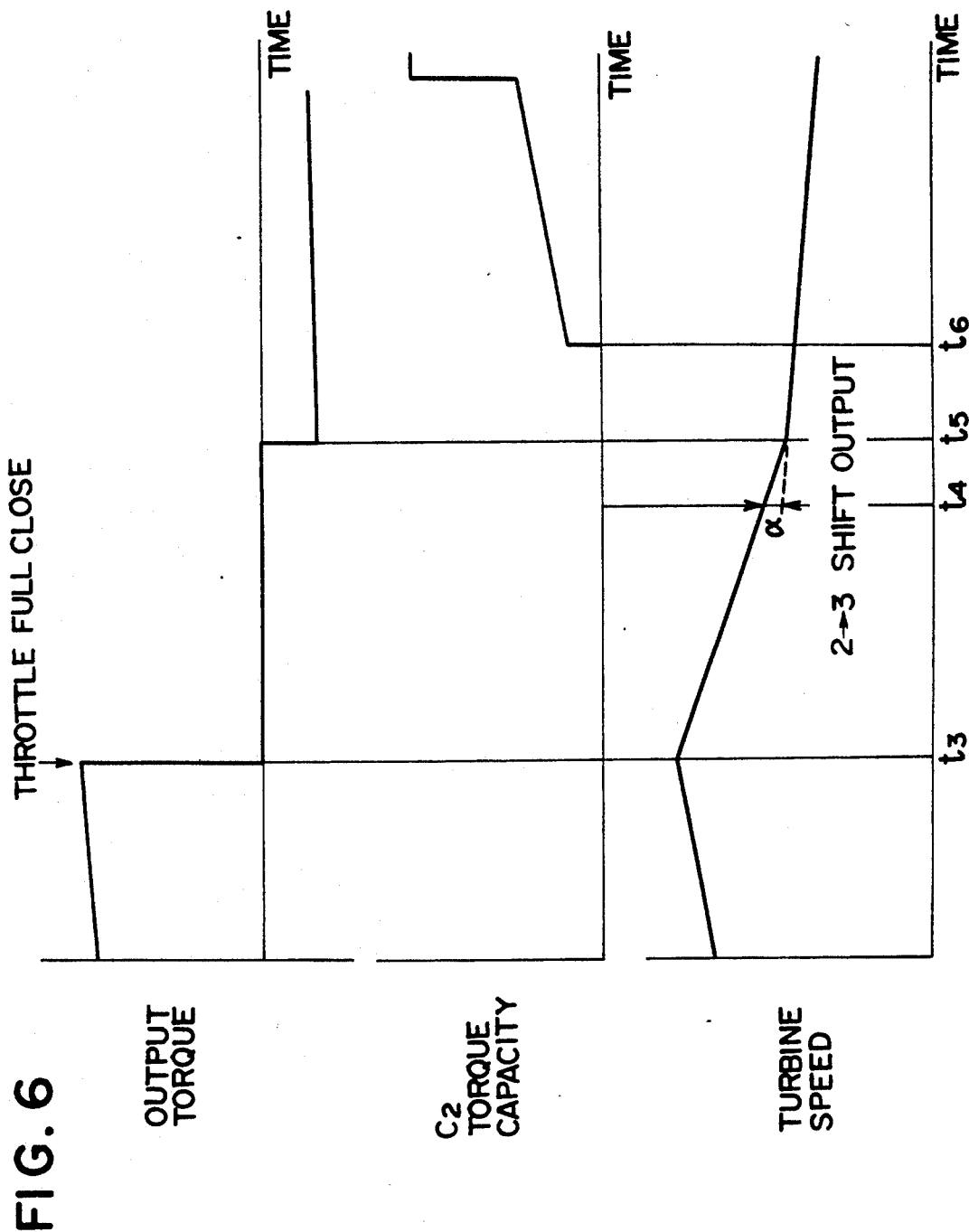
FIG. 6 is a time chart showing time changes in the output torque, the torque capacity of a second clutch and the turbine speed.

In the aforementioned individual examples shown in FIGS. 5 to 7, the synchronous rotation of the turbine is adopted as the condition for outputting the command signal to the frictional engagement units for holding the gear stage after the upshift. Since, however, the synchronous rotation by the upshift from the 2nd to 3rd speeds or from the 3rd to 4th speeds at the power-off time is achieved after lapse of a predetermined time period after the shift has been decided, the satisfaction of the condition may be exemplified, by determining the time period in advance, that the time period elapses, and the engagement elements such as the second clutch C2 or the second brake B2 may be actuated.

Figure 9:
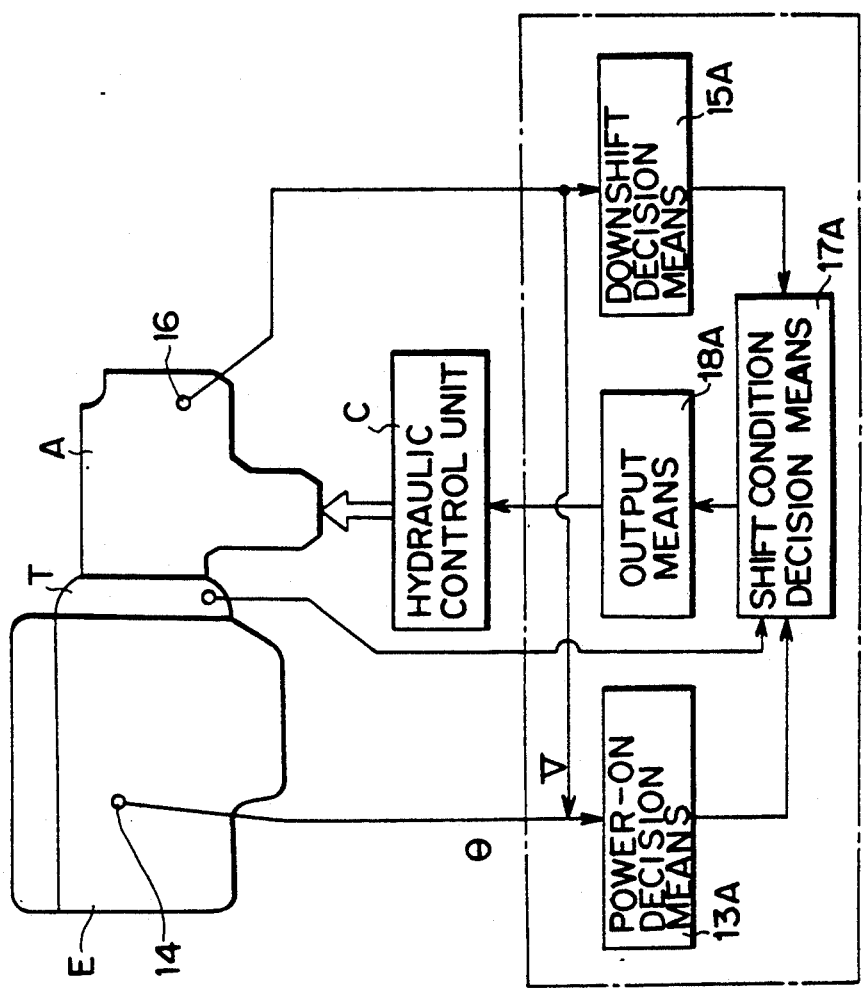
FIG. 9 is a block diagram showing another embodiment of the present invention schematically.

FIG. 9 is a block diagram showing another embodiment which is constructed to be suited for a power-on downshift. An electronic control unit (ECU) 12A is composed mainly of arithmetic elements, memory elements and an interface, as is functionally shown in FIG. 9. Specifically, power-on decision means 13A outputs a signal by detecting either an increase in the degree of throttle opening $\theta$ inputted from a throttle opening sensor 14 of the engine E or an increase (i.e., power-on) in the engine output from the actual throttle opening $\theta$. On the other hand, a downshift decision means 15A outputs a signal by deciding that the running state of a vehicle is to be shifted down, on the basis of a vehicle speed signal V outputted from a vehicle speed sensor 16 built in the automatic transmission A, the throttle opening signal $\theta$, and a shift map stored in advance. Moreover, shift condition decision means 17A decides whether or not the conditions decided by the downshift decision means 15A for actuating predetermined frictional engagement units so as to hold a gear stage after the downshift hold. The conditions to be adopted can be exemplified by the fact that the ratio between the speed of an output member and the speed of a turbine in the torque converter T takes a predetermined value near the gear ratio after the downshift or that a predetermined set time has elapsed. Still moreover, output means 18A outputs a signal to the hydraulic control unit C so the predetermined frictional engagement units may be actuated to hold the gear stage after the downshift.

Figures 19, 20:
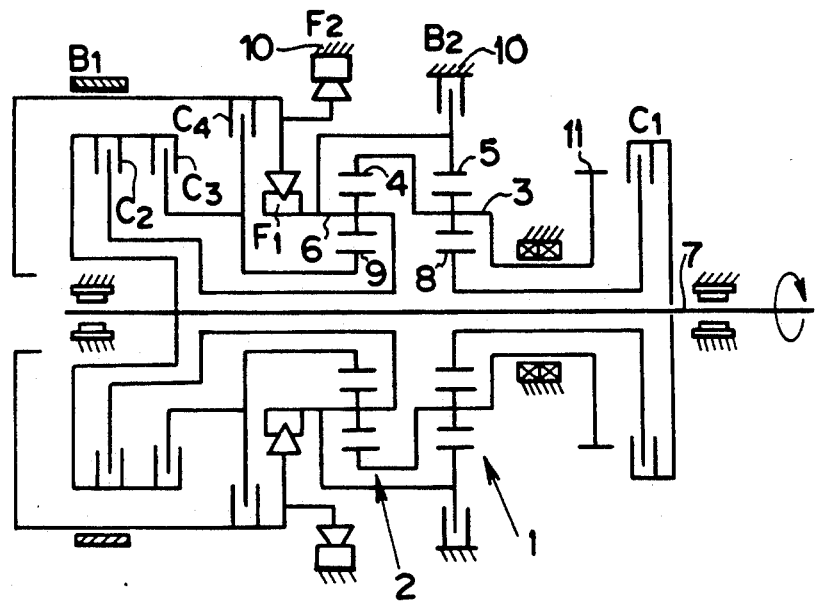
FIG. 19 is a skeleton diagram showing a gear train of an automatic transmission to which the present invention is applied.
FIG. 20 is a clutch and brake application chart of the same.
Figure 21:
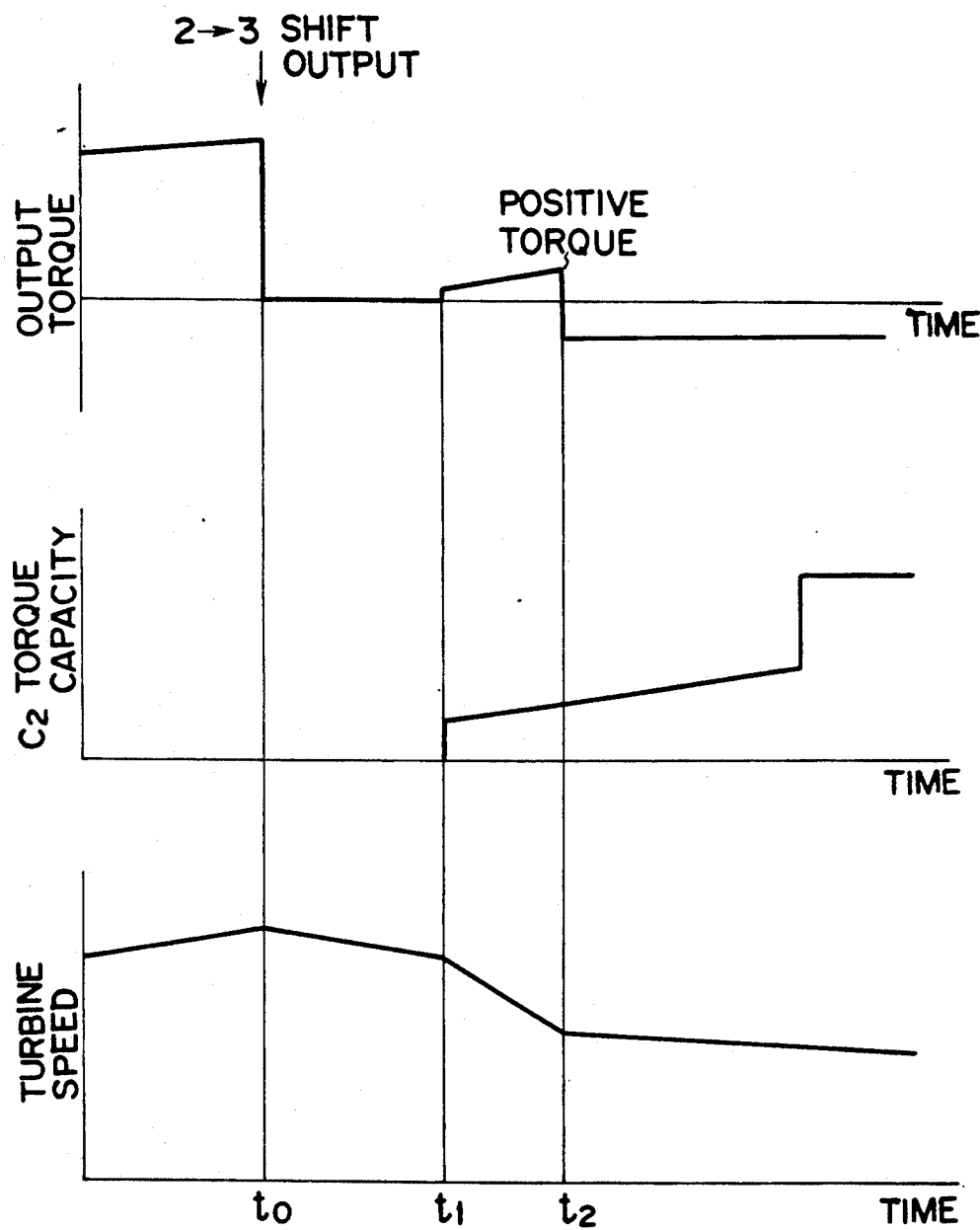
FIG. 21 is a time chart showing changes in the output torque, the torque capacity of the first clutch and the turbine speed in case torque fluctuations for causing the shift shocks take place.

The gear train of the automatic transmission A is exemplified by that shown in FIG. 19, and the oil pressure circuit in the hydraulic control unit C is exemplified by that shown in FIGS. 2 and 3.

Figure 10:
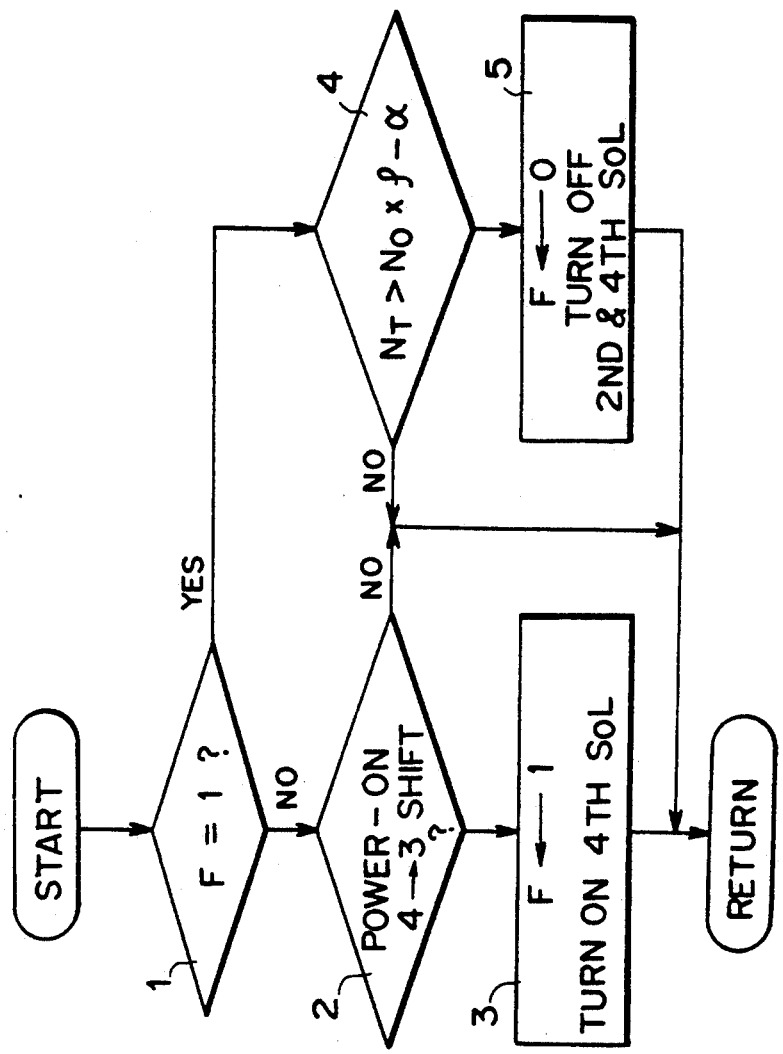
FIG. 10 is a flow chart showing a control routine for a power-on downshift from 4th to 3rd speeds.

A control of power-on downshift from the 4th to 3rd speeds by the aforementioned apparatus will be described in the following. FIG. 10 is a flow chart for the control. At the 4th speed, the first solenoid valve 90 is OFF, and the second solenoid valve 91 is ON. Thus, the 2-3 shift valve 50 has the oil pressure released from its control port 54 so that its spools 51 and 52 are lifted to the positions shown at the lefthand of the drawing. As a result, the second D port 56 is given communication with the clutch port 59 so that the second clutch C2 connected to the clutch port 59 is engaged by the fed oil pressure. Since, on the other hand, the 1-2 shift valve 30 has its hold port 45 fed with the oil pressure from the clutch port 59 of the 2-3 shift valve 50, the spool 31 is lifted off, as shown at the righthand of the drawing, by the line pressure $P_L$ fed to the control port 33. As a result, the first D port 34 is given communication with the clutch port 35 so that the fourth clutch C4 connected thereto is fed with the oil pressure and engaged. Moreover, the 3-4 shift valve 70 has its control port 73 subjected to the line pressure $P_L$ to have its spool 71 lowered to the position shown at the righthand of the drawing so that the second D port 75 connected to the oil passage 104 is given communication with the brake port 76. In the B1 control valve 80, the first D port 84 connected to the brake port 76 of the 3-4 shift valve 70 is in communication with the brake port 86 so that the first brake B1 is fed with the oil pressure and engaged.

If, in this state, the accelerator pedal is depressed to open the throttle valve to its full stroke so that the running state accordingly comes into the 3rd speed defined by the shift diagram, the decision result of Step 1 is "NO" in the flow chart shown in FIG. 10. Specifically, the decision of this Step 1 is to decide whether or not the control flag F is at "1". This control flag F indicates whether or not the fourth solenoid valve 92 is ON and is initially set to "0" because the fourth solenoid valve 92 is ordinarily OFF. At subsequent Step 2, the full opening of the throttle valve and the according downshift to the 3rd speed are decided to give the decision result of Step 2 "YES". In this case, however, the 3-4 shift valve 70 is not instantly switched for setting the 3rd speed, but the fourth solenoid valve 92 is turned on at first to switch the B1 control valve 80 (at Step 3). Simultaneously with this, the control flag F is set to "1". When the fourth solenoid valve 92 is turned on, the B1 control valve 80 has the oil pressure released from its control port 83 to have its spool 81 lifted to the position shown at the lefthand of the drawing so that the brake port 86 is given communication with the drain port 85. In short, the first Brake B1 is released from the oil pressure.

Since, in this state, a high torque in the forward direction is applied to the carrier 6 of the second planetary gear mechanism 2 connected to the input shaft 7 through the second clutch C2, the rotational speed of not only the carrier 6 but also the sun gear 9 is increased.

After the fourth solenoid valve 92 has been turned on, the control process returns to Step 1, at which it is decided whether or not the control flag F is at "1". At this time, however, the control flag F has taken the value "1" because the process has passed through Step 3, and the decision result is "YES" so that the process advances to Step 4.

This Step 4 is one for deciding whether or not the condition for engaging the first clutch C1 to hold the 3rd speed is satisfied and adopts the synchronization of the turbine speed as the condition in the example of FIG. 10. If the first brake B1 is released in the power-on state, as has been described hereinbefore, the sun gear 9 of the second planetary gear mechanism 2 rotates gradually at a higher speed in the forward direction until the first one-way clutch F1 is engaged to connect the sun gear 9 and the carrier 6. Since, in this state, the second planetary gear mechanism 2 rotates in its entirety, the input speed and the output speed, namely, the turbine speed and the speed of the drive gear 11 grow equal to each other. Thus, whether or not the turbine speed $N_T$ has reached a specified one, that is, whether or not the condition has been satisfied is decided at Step 4 by comparing the value, which is determined from the speed $N_O$ of the drive gear 11 or the output member, the gear ratio $\rho$ at the 3rd speed and the predetermined correcting constant $\alpha$, with the actual turbine speed $N_T$. If the decision result at this Step 4 is "YES", the routine advances to Step 5, at which the second solenoid valve 91 and the fourth solenoid valve 92 are turned off and the control flag F is set to "0".

As a result, the 3-4 shift valve 70 is released from its oil pressure via its control port 73 to lift its spool 71 to the position shown at the lefthand of the drawing thereby to give the clutch port 79 communication with the second D port 75 so that the first clutch C1 is fed with the oil pressure and engaged. Incidentally, if the fourth solenoid valve 92 is turned off, the B1 control valve 80 has its control port 83 subjected to the line pressure $P_L$ to lower the spool 81 to the position shown at the righthand of the drawing so that the brake port 86 communicates with the first D port 84. Since, however, this first D port 84 is given communication with the drain port 64 via the brake port 76 and the first d port 74 of the 3-4 shift valve 70, the brake port 38 and the S port 37 of the 1-2 shift valve 30 and the brake port 65 of the 2-3 shift valve 50, so that the first brake B1 continues its released state.

In short, the first clutch C1 to be engaged for holding the 3rd speed is engaged after the turbine speed has been sufficiently increased, so that the negative torque hardly appears in the output torque.

Here: the aforementioned decisions of Steps 1 and 2 are carried out by the power-on decision means 12A and the downshift decision means 15A; the decision of Step 4 is carried out by the running condition decision means 17A; and the controls of Steps 3 and 5 are carried out by the output means 18A.

Figure 11:
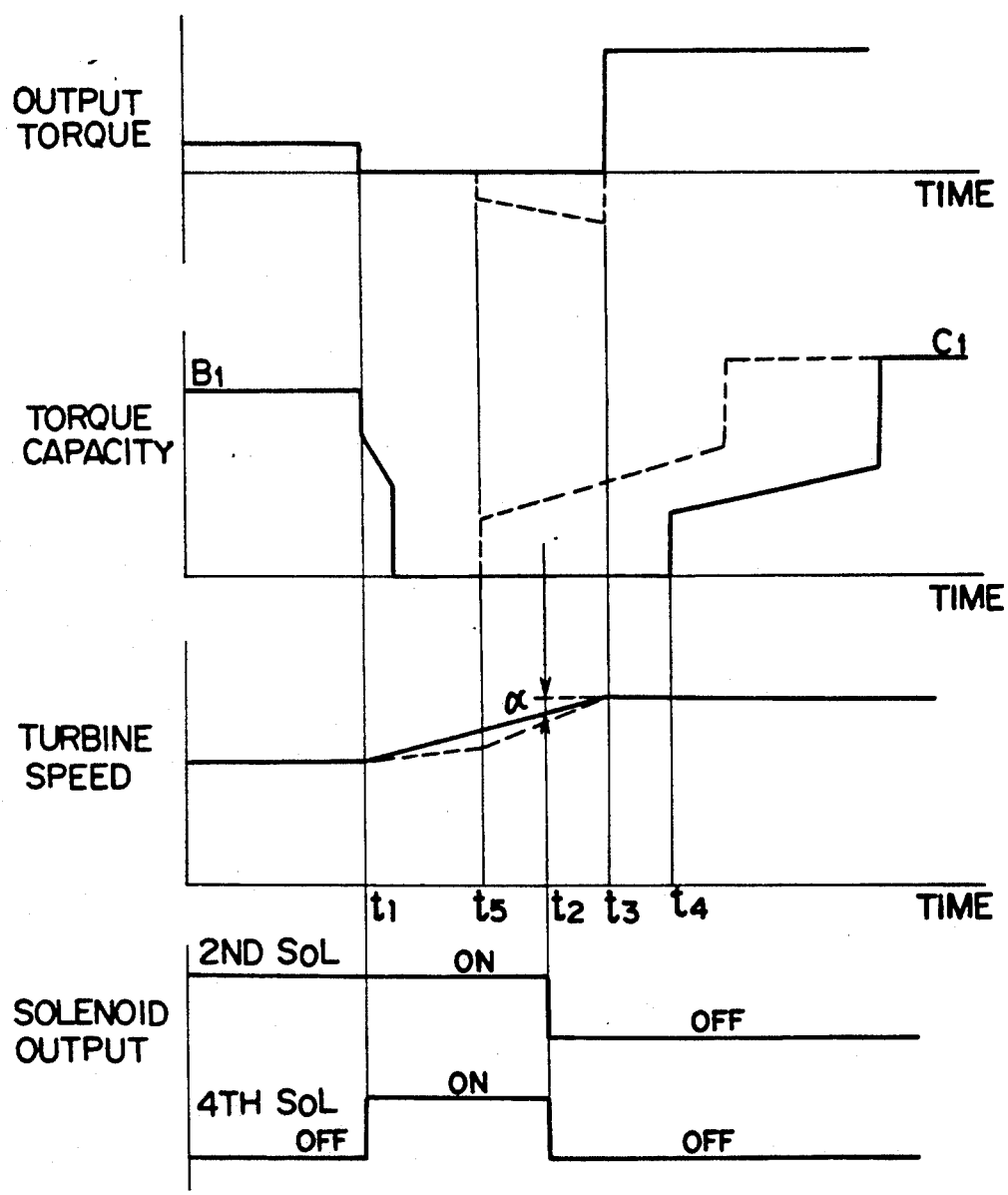
FIG. 11 is a time chart showing time changes in the output torque, the torque capacity of the first clutch, the turbine speed and the solenoid output at the time of the shift.

The changes in the output torque in the downshift from the 4th to 3rd speeds at the aforementioned power-on time, the torque capacities of the first clutch C1 and the first brake B1, the turbine speed, and the ON/OFF of the second and fourth solenoid valves 91 and 92 are illustrated in FIG. 11.

If the throttle opening becomes full at an instant $t_1$ while the vehicle is running at the 4th speed so that the power-on and accordingly the downshift to the 3rd speed is decided, the fourth solenoid valve 92 is turned off at the instant $t_1$ so that the torque capacity of the first brake B1 drops together with the output torque. On the contrary, the turbine speed begins to rise gradually. If this turbine speed reaches a predetermined value, namely, if the aforementioned decision result of Step 4 is "YES", the second solenoid valve 91 and the fourth solenoid valve 92 are turned off (at an instant $t_2$). At an instant $t_3$ after a time period corresponding to the aforementioned constant $\alpha$ has elapsed, the first one-way clutch F1 is engaged, and the output torque rises the torque corresponding to the gear ratio of the 3rd speed. Moreover at an instant $t_4$ after an inevitable time lag has elapsed from the instant $t_2$ at which the second solenoid valve 81 and the fourth solenoid valve 92 were turned off, the torque capacity is established in the first clutch C1 to maintain the 3rd speed. In other words, at an instant when the first clutch C1 is engaged, the driving state at the gear train is at the 3rd speed so that no negative torque is established in the output torque while preventing the shift shocks from being deteriorated, even if the first clutch C1 is engaged.

In the control apparatus of the prior art, on the contrary, the first clutch C1 is engaged (at an instant $t_5$) before the turbine speed is sufficiently accelerated, as indicated by dash lines in FIG. 11, to decelerate the speed of the sun gear 8 of the first planetary gear mechanism 1 so that the negative torque is established in the output torque to cause the shift shocks.

Incidentally, the aforementioned embodiment shown in FIG. 10 adopts the synchronous rotation of the turbine as the output condition of the command signal to be fed to the frictional engagement units for holding a gear stage after a downshift. Since, however, the synchronous rotation by the downshift from the 4th to 3rd speeds at the power-on time is achieved a predetermined time period after the shift has been decided, the engagement elements such as the second clutch C2 or the second brake B2 may be operated on condition that a time period determined in advance for the achievement has elapsed.

Moreover, the gear train, to which the present invention is applied, should not be limited to that shown in FIG. 19 so that the shift control according to the present invention should not be limited to the power-on downshift from the 4th to 3rd speeds, as described in the foregoing embodiment.

In the oil pressure circuit shown in FIGS. 1 and 2, the feed and release of the oil pressure to and from the first brake B1 are carried out through the B1 control valve 80, and this B1 control valve 80 is controlled by the fourth solenoid valve 92 which takes no part in setting the gear stages. Thus, the relative engaging/releasing timings of the first clutch C1 and the first brake B1 can be suitably controlled even if one of the feed and release of the oil pressure to the first clutch C1 and the first brake B1 should be switched by one 3-4 shift valve 70.

A control for preventing the so-called "double lock" will be described as an example of the control such timing adjustment.

In order to effect shifts between the 3rd and 4th speeds in the automatic transmission equipped with the gear train shown in FIG. 19, the first brake B1 may be engaged simultaneously as the first clutch C1 is released, and vice versa. Thus, the aforementioned 3-4 shift valve 70 is effective in that it can prevent the oil pressure from being fed to both the first clutch C1 and the first brake B1, because it performs the control through one valve. However, the feed/release of the oil pressure is influenced by the viscosity of the oil, the resistances of the oil passages, the centrifugal oil pressure and so on so that the torque capacities of the engagement elements are diversely changed according to the situations.

In case of a shift from the 3rd to 4th speeds in the aforementioned embodiment, for example, the oil pressure is not released from the first clutch C1 immediately after the 3-4 shift valve 70 is switched, to leave the torque capacity, and the feed of the oil pressure to the first brake B1 may progress quickly. If, in this case, the release of the oil pressure from the first clutch C1 and the feed of the oil pressure to the first brake B1 are simultaneously started, there is established a time period for which the two elements have torque capacities of some extent. This phenomenon is illustrated in a diagram in FIG. 12. As shown, the period for which a torque capacity of some extent is established in the first brake B1 while the torque capacity of the first clutch C1 is left, is the double lock state. Since, in this state, the torque of the drive gear 11 or the output means abruptly drops for a while, the shift shocks are increased.

In case of the upshift from the 3rd to 4th speeds of the aforementioned apparatus, the fourth solenoid valve 92 is turned on to release the oil pressure from the control port 83 of the B1 control valve 80 so that the spool 81 is lifted to the position shown at the righthand of the drawing to give the brake port 86 communication with the drain port 85. In this state, moreover, the first D port 84 is closed. Thus, if the second solenoid valve 91 is turned on to switch the 3-4 4 shift valve 70 so as to execute the upshift from the 3rd to 4th speeds, the oil pressure is released from the first clutch C1 through the 3-4 shift valve 70 and the 2-3 shift valve 50, as has been described above, but the first brake B1 is not fed with the oil pressure and is maintained in the release state. If the fourth solenoid valve 92 is turned off after the torque capacity of the first clutch C1 has sufficiently dropped, the B1 control valve 80 has its control port 83 fed with the line pressure $P_L$ to have its spool 81 lowered to the position shown at the righthand of the drawing so that the brake port 86 and the first D port 84 communicate with each other to engage the first brake B1 by the fed oil pressure.

Figure 12A:
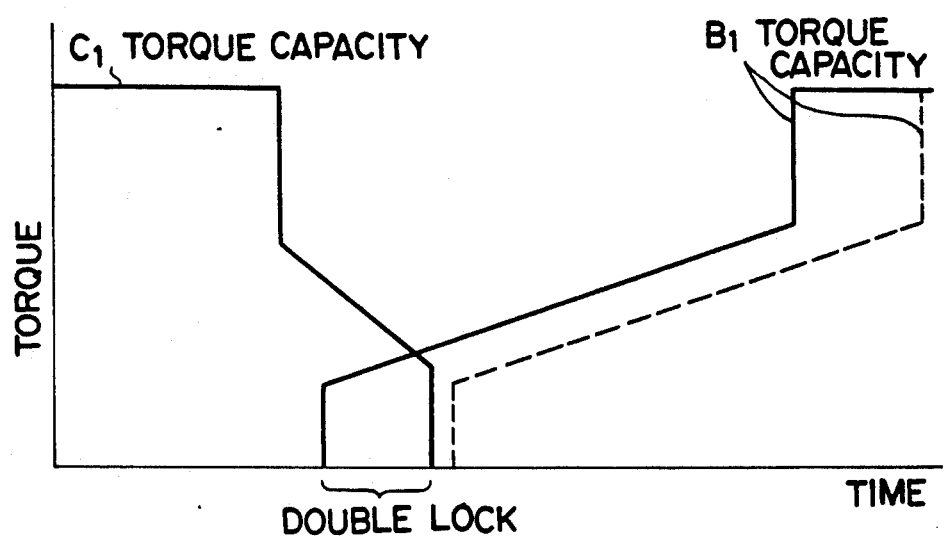
FIGS. 12A and 12B are time charts showing time changes in the torque capacity and oil pressure of the first clutch and the torque capacity and oil pressure of a first brake.
Figure 12B:
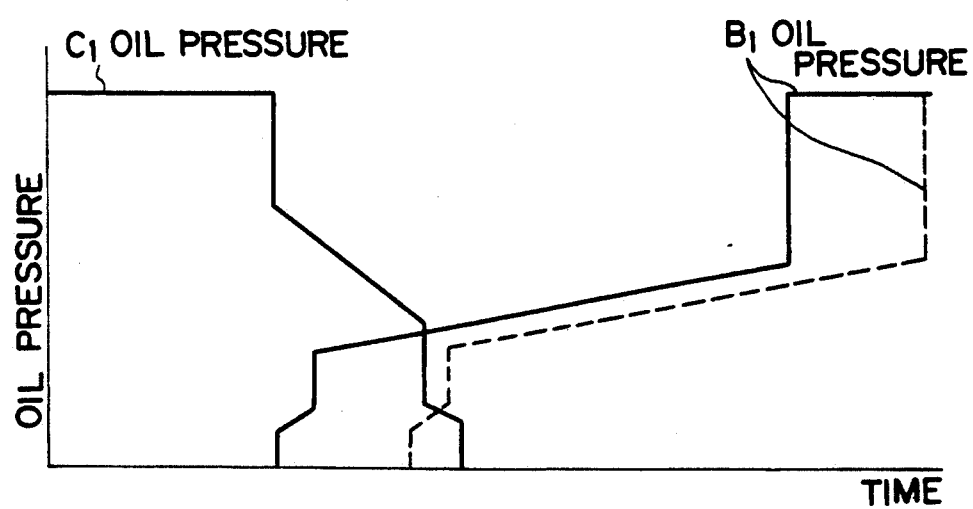

In short, the torque capacity of the first brake B1 appears when the first clutch C1 performs little transmission of the torque, so that the aforementioned double lock state can be avoided, as illustrated by dash lines in FIG. 12.

Unless the B1 control valve 80 is especially operated in case of the downshift from the 4th to 3rd speeds, the oil pressure is released from the first brake B1 via the brake port 76 and the S port 74 of the 3-4 shift valve 70, the brake port 38 and the S port 37 of the 1-2 shift valve 30, and the brake port 65 and the drain port 66 of the 2-3 shift valve 50. If the B1 control valve 80 is operated, on the contrary, the oil pressure can be instantly released from the first brake B1. At the time of the downshift from the 4th to 3rd speeds, the fourth solenoid valve 92 is temporarily turned on before the second solenoid valve is switched from ON to OFF. As a result, the spool 81 in the B1 control valve 80 is lifted at first, as shown at the righthand of the drawing, so that the brake port 86 is given communication with the drain port 85 to release the oil pressure promptly from the first brake B1. After this, the second solenoid valve 91 is turned off to switch the 3-4 shift valve 70 and turn off the fourth solenoid valve 92. Then, after the torque capacity of the first brake B1 has sufficiently dropped, the torque capacity of the first clutch C1 can be increased to prevent the aforementioned double lock and the accompanying deterioration of the shift shocks.

Incidentally, the rates of feeding and releasing the oil pressure to and from the first clutch C1 and the first brake B1 and the rates of increasing and decreasing the torque capacities accordingly are influenced by various factors such as the oil viscosity (or oil temperature) or the centrifugal oil pressure. Since, however, the fourth solenoid valve 92 can be solely controlled, the B1 control valve 80 can be controlled in accordance with the various situations and running states to optimize the relative engaging/releasing timings of the first clutch C1 and the first brake B1.

Four combinations can be obtained, as shown in FIG. 13, between the ON/OFF of the second solenoid valve 91 for controlling the aforementioned 3-4 shift valve 70 and the ON/OFF of the fourth solenoid valve 92 for controlling the B1 control valve 80. The clutches and/or brakes to be engaged in the individual cases and the gear stages to be set are enumerated together in FIG. 13. These combinations of the ON/OFF of the individual solenoid valves 91 and 92 occur when the engaging/releasing timings of the first clutch C1 and the first brake B1 at the time of the aforementioned shift from the 3rd to 4th speeds. If, however, the second solenoid valve 91 is OFF, the first solenoid valve 90 is OFF. As a result, no matter which the fourth solenoid valve 92 might be ON or OFF, the 3rd speed of directly connected stage is set, in which the first clutch C1, the second clutch C2 and the fourth clutch C4 are engaged. This setting is effected both at the driving time in which the torque is supplied from the engine, and the driven time in which the torque is supplied from the wheel side.

If, on the contrary, the second solenoid valve 91 is ON, the fourth solenoid valve 92 is turned on to release the first clutch C1 to engage the two clutches, i.e, the second clutch C2 and the fourth clutch C4. Since, in this case at the driving time when the torque is given from the engine, the sun gear 9 in the second planetary gear mechanism 2 is going to rotate forward at a higher speed than the carrier 6, the first one-way clutch F1 is engaged to rotate the second planetary gear mechanism 2 in its entirety so that the 3rd speed of directly connected stage is established. At the driven time when the torque is given from the wheel side, on the contrary, a torque in the opposite direction is applied to the sun gear 9 so that not the first one-way clutch F1 but the second one-way clutch F2 is engaged to establish the 4th speed or the overdrive stage.

If, moreover, the second solenoid valve 91 is ON whereas the fourth solenoid valve 92 is OFF, not only the second clutch C2 and the fourth clutch C4 but also the first brake B1 are engaged to set the 4the speed at either the driving or driven time.

Thus, even if a valve stick occurs in the B1 control valve 80 so that the first brake B1 is not fed with the oil pressure or not engaged, the aforementioned apparatus can set the 1st to 3rd speeds, thus retaining the run at a time of failure.

In the automatic transmission having the gear train shown in FIG. 19, the engine brake can be effected at both the 3rd and 4th speeds, and the shift between these speeds has to be achieved by switching the two engagement elements, i.e., the first clutch C1 and the first brake B1 in a good timing. It is generally difficult to effect the shift of switching the two engagement elements with few shift shocks and without any excessive wear of the engagement elements. In the hydraulic control apparatus thus far described, however, the shift between the 3rd and 4th speeds at which the engine brake is effective, can be facilitated thanks to the provision of the B1 control valve 80.

When both the second solenoid valve 91 and fourth solenoid valve 92 are ON, as shown in FIG. 13, the 3rd speed is established at the driving time, but the 4th speed is established at the driven time. These settings are obtained by engaging the first one-way clutch F1 or the second one-way clutch F2. If the state in which both the second solenoid valve 91 and the fourth solenoid valve 92 are turned on to engage the second clutch C2 and the fourth clutch C4, is temporarily set at a shift between the 3rd and 4th speeds, then the so-called "clutch (or brake) to oneway clutch" or "one-way clutch to clutch (or brake)" shift, in which the one-way clutch is applied simultaneously as the clutch or brake is switched, can be effected to facilitate the control.

Figure 14:
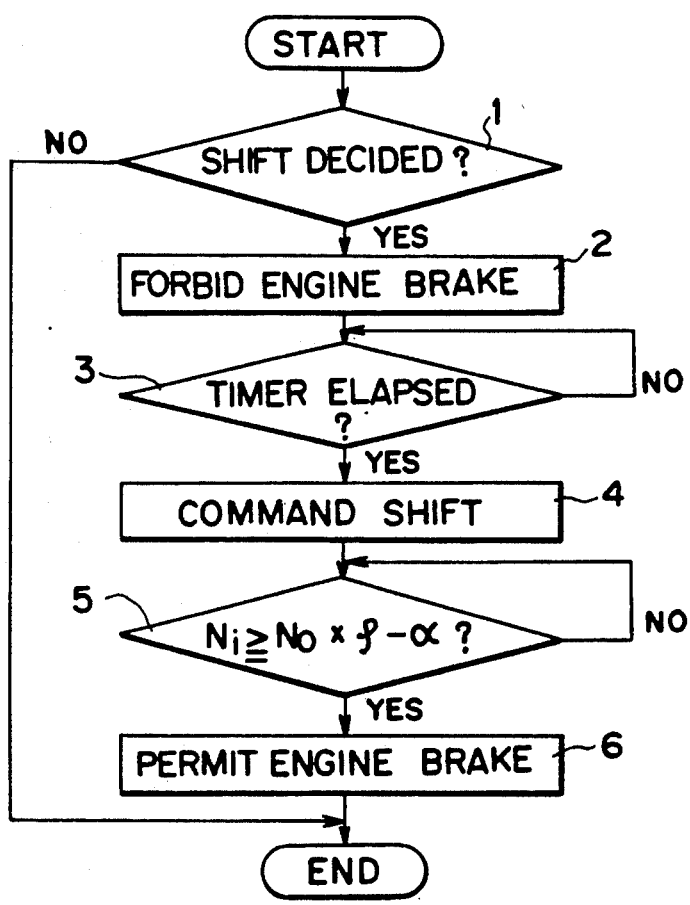
FIG. 14 is a flow chart showing a control routine for executing a power-on downshift from the 4th to 3rd speeds by actuating one-way clutches effectively.
Figure 15:
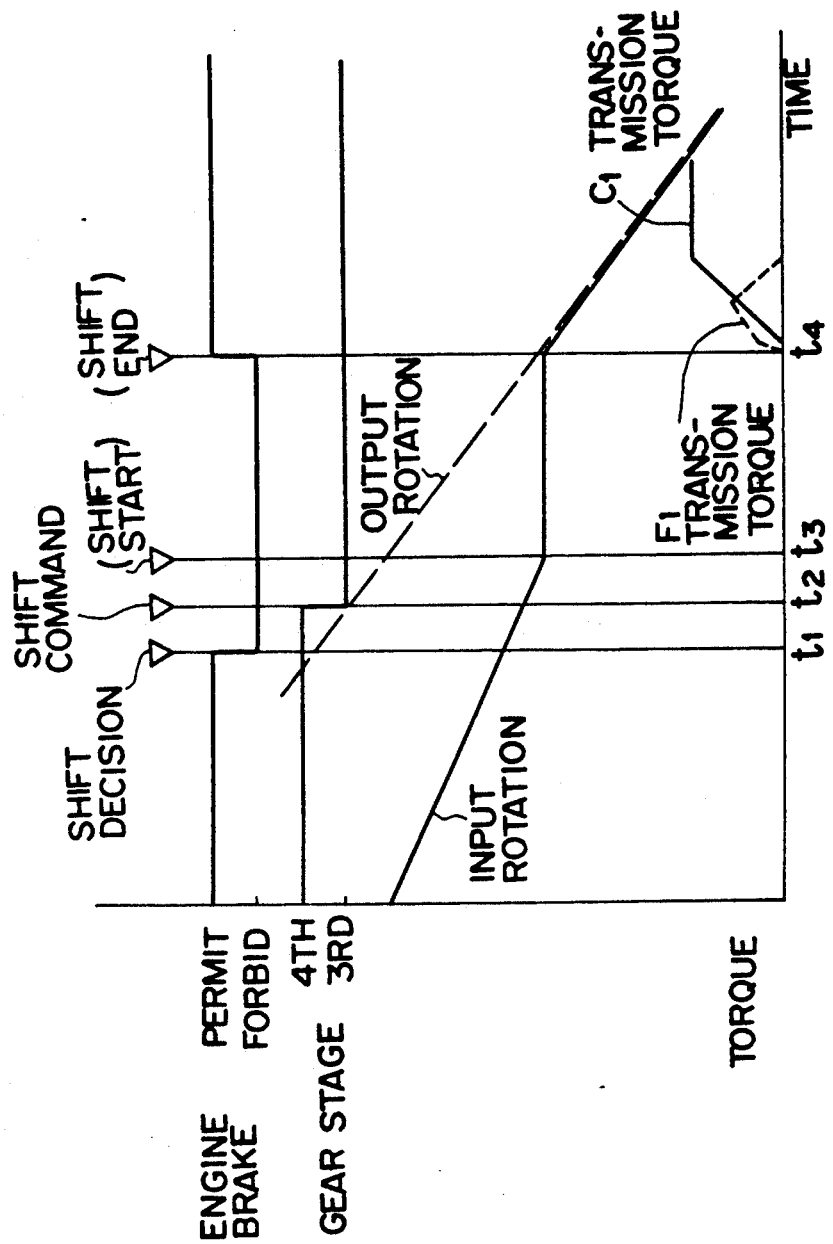
FIG. 15 is a time chart mainly showing changes in the input and output speeds at the time of the shift.

This shift will be exemplified in the following in case of the power-off downshift from the 4th to 3rd speeds. FIG. 14 is a flow chart for the shift control, and FIG. 15 is a time chart for the same. If the power-off downshift is decided (i.e., "YES" at Step 1) at an instant $t_1$ while the vehicle is running at the 4th speed, the engine brake is forbidden (at Step 2). Specifically, the fourth solenoid valve 92 is turned on to release the first brake B1. As a result, the second one-way clutch F2 is engaged to fix the sun gear 9 of the second planetary gear mechanism 2, or the first one-way clutch F1 is engaged to connect the sun gear 9 and the carrier 6. Thus, the 3rd speed is established at the driving time, but the 4th speed is established at the driven time, as shown in FIG. 13. Since this case is directed to the power-off downshift, the 4th speed is maintained, and the engine braking state is not caused at the the 3rd speed.

After a predetermined time period has elapsed (i.e., "YES" Step 3), a shift command is outputted (at Step 4), as indicated at an instant $t_2$ in FIG. 15. At an instant indicated at $t_3$, the shift is started to suppress decrease in the input speed. Thus, the end of the shift can be decided from the input speed $N_i$, the output speed $N_O$ and the gear ratio $\rho$ after the shift. At Step 5, therefore, the following condition is decided:

$$N_i \geqq N_O \times \rho - \alpha (\alpha: \text{a constant}).$$

If this condition is satisfied at an instant $t_4$, the engine brake is allowed (at Step 6). Specifically, the second solenoid valve 91 is turned off to engage the first clutch C1. As a result, the 3rd speed is substantially established.

Incidentally, in case of the control shown in FIG. 14, the permission of the engine brake can be decided in terms of data such as the engine speed or the speed of another rotating member.

Moreover, the power-on upshift from the 3rd to 4th speeds and the power-on downshift from the 4th to 3rd speeds will be briefly described in the following.

Figure 16:
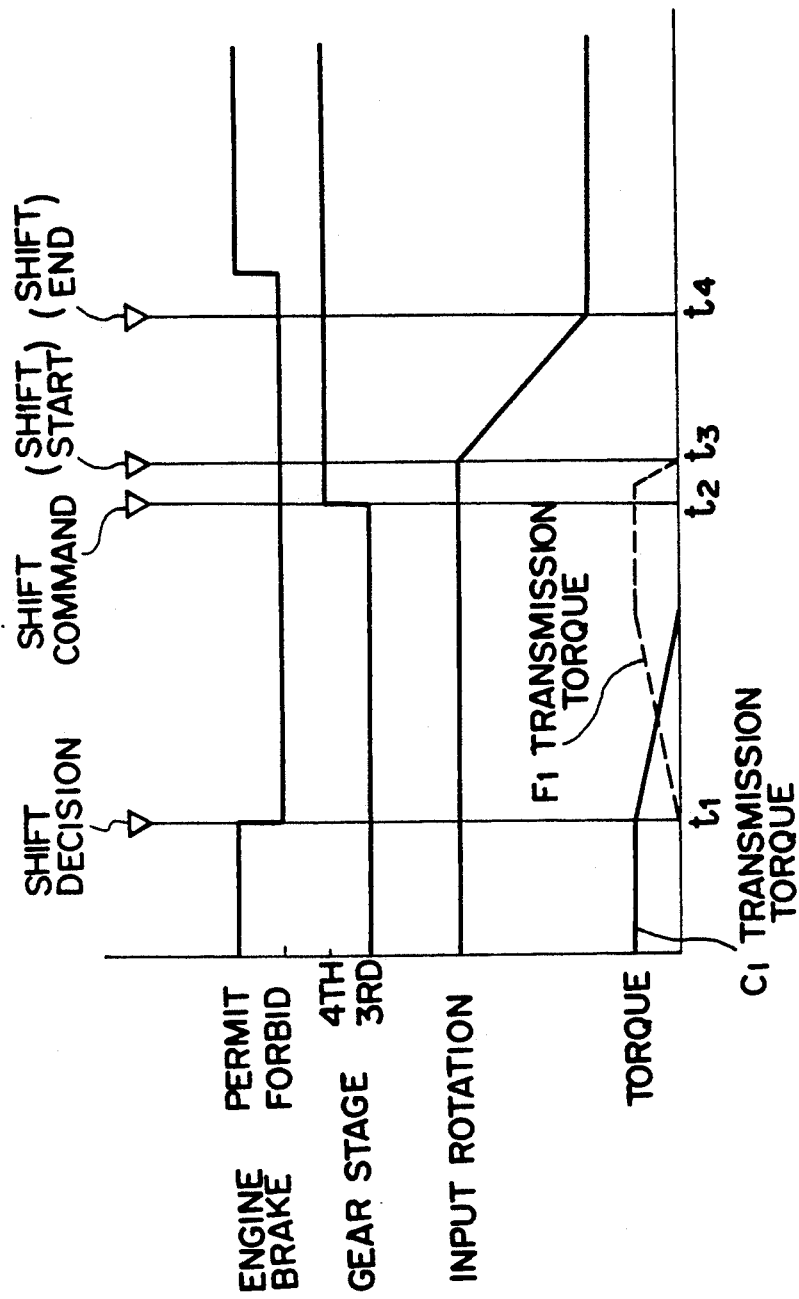
FIG. 16 is a time chart at the time of a power-on upshift.

FIG. 16 is a time chart in case of the power-on upshift. If a shift to the 4th speed is decided at an instant $t_1$ while the vehicle is running at the 3rd speed, the first clutch C1 is instantly released to forbid the engine brake at the 3rd speed. In this case, the first one-way clutch F1 is engaged to maintain the state of the 3rd speed. If the shift is started by outputting the shift command at an instant $t_2$ while the first one-way clutch F1 is transmitting the torque and by immediately feeding the oil pressure to the first brake B1 at an instant $t_3$, the first one-way clutch F1 loses the torque so that the first brake B1 is substantially completely engaged to establish the 4th speed.

Figure 17:
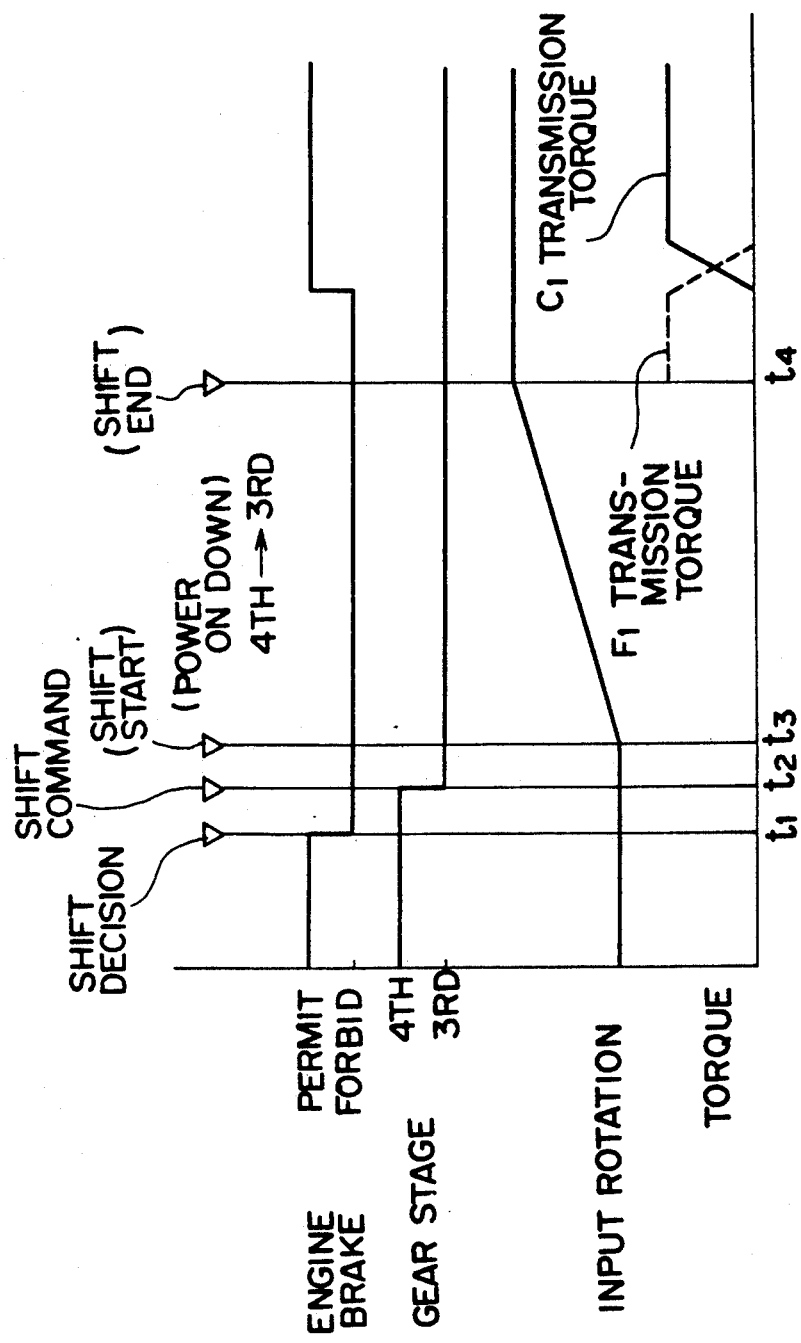
FIG. 17 is a time chart at the time of a power-on downshift.

FIG. 17 is a time chart in case of the power-on downshift. If the shift to the 3rd speed is decided at an instant $t_1$ with an increase in the throttle opening while the vehicle is running at the 4th speed, the first brake B1 is instantly released to forbid the engine brake at the 3rd speed. At an instant $t_2$ immediately after this, the shift command is outputted so that the shift is started at an instant $t_3$. As a result, when the sun gear 9 and the carrier 6 of the second planetary gear mechanism 2 take substantially equal speeds, the first one-way clutch F1 is engaged to transmit the torque. After an instant $t_4$ at the end of the shift, the first clutch C1 is engaged to permit the engine brake.

In the oil pressure circuit shown in FIG. 3, the brake port 86 is given communication with the drain port 85 to release the first brake B1 by releasing the oil pressure from the control port 83 of the control valve 80. In the oil pressure circuit shown in FIG. 3, therefore, the 4th speed can neither be set nor can be effected the engine brake at the 2nd speed, if the fourth solenoid valve 92 is shortened and left ON or if the control valve 80 sticks to leave the brake port 86 and the drain port 85 communicating with each other. These disadvantages can be eliminated by improving the portion shown in FIG. 3 of the oil pressure circuit shown in FIGS. 2 and 3 to one shown in FIG. 18.

Figure 18:
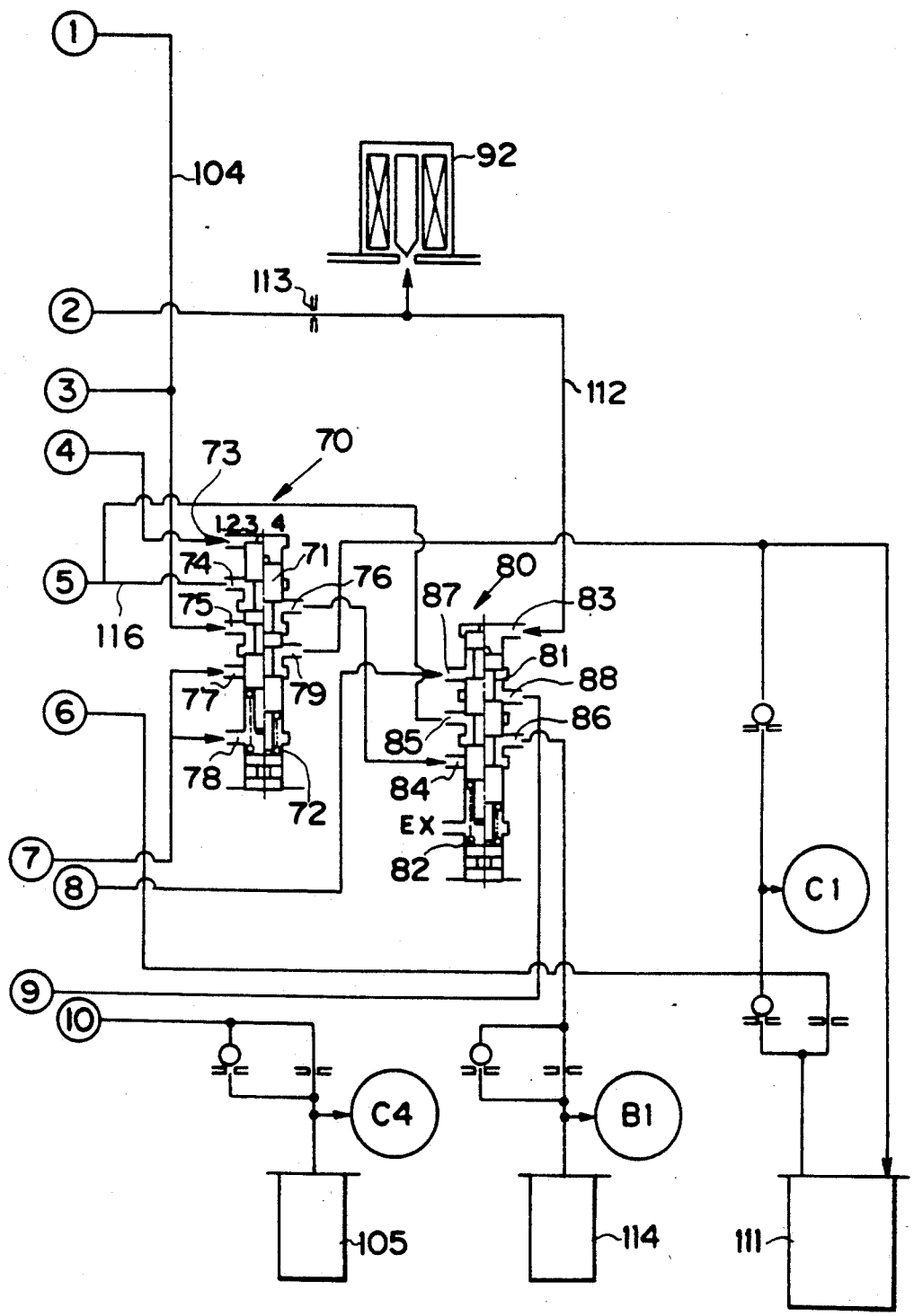
FIG. 18 an oil pressure circuit diagram showing a portion of another embodiment of the oil pressure according to the present invention.

In FIG. 18, the drain port 85 of the control valve 80 and the brake port 38 of the 1-2 shift valve 30 are connected by way of an oil passage 116 so that the drain port 85 provides an S port. If the spool 81 of the control valve 80 is left in the position shown at the lefthand half of FIG. 18, the first brake B1 is given communication with the brake port 38 of the 1-2 shift valve 30 by way of the oil passage 116. If the S range or the L range is selected, the S port 24 of the manual valve 20 is given communication with the input port 22 to feed the oil pressure to the S port 63 of the 2-3 shift valve 50. If the 2nd speed is to be set, the 2-3 shift valve 50 has its spool 51 lowered to the position shown at the righthand on FIG. 2 so that the S port 63 communicates with the brake port 65. As a result, the S port 37 of the 1-2 shift valve 30 is fed with the oil pressure. In case the 2nd speed is to be set, the 1-2 shift valve 30 has its spool 31 lifted to the position shown at the righthand half of FIG. 2, so that its S port 37 communicates with the oil passage 116 via the brake port 38. As a result, the first brake B1 is fed with the oil pressure and engaged.

What is claimed is:

1. A shift control apparatus for an automatic transmission including a gear train having a plurality of one-way clutches having their engagement states switched in accordance with torque applying directions and a plurality of frictional engagement units adapted to be engaged by oil pressures, said apparatus comprising:

power-off decision means for deciding a decrease in an input torque; upshift decision means for deciding occurrence of an upshift, in which a speed ratio is decreased with a decrease in the input torque; engagement condition decision means for deciding the satisfaction of the engagement condition on the basis of the decision results of said power-off decision means and said up-shift decision means; and output means for outputting a signal to engage a first one of said frictional engagement units if the satisfaction of said engagement condition is decided by said engagement condition decision means, and wherein said one-way clutches are engaged or released as the input torques decreases, to establish an upshift to said predetermined gear stage from a gear stage having a higher gear ratio than said predetermined gear stage.

2. An automatic transmission shift control apparatus according to claim 1, wherein said engagement condition decision means includes decision means for deciding the satisfaction of said condition if the ratio of rotational speeds of predetermined two members in said gear train is equal to or lower than a predetermined value.

3. An automatic transmission shift control apparatus according to claim 1, wherein said engagement condition decision means includes decision means for deciding the satisfaction of said condition if the ratio of an input rotational speed of said automatic transmission and an output rotational speed is lower by a predetermined value than the gear ratio at said predetermined gear stage.

4. An automatic transmission shift control apparatus according to claim 1, wherein said engagement condition decision means includes decision means for deciding the satisfaction of said condition if a predetermined time period elapses after a shift to said predetermined gear stage has been started.

5. A shift transmission including a gear train having a plurality of one-way clutches having their engagement states switched in accordance with torque applying directions and a plurality of frictional engagement units adapted to be engaged by oil pressures, said apparatus comprising:

power-on decision means for deciding an increase in an input torque; downshift decision means for deciding occurrence of a downshift, in which a speed ratio is increased with an increase in the input torque; engagement condition decision means for deciding the satisfaction of the engagement condition on the basis of the decision results of said power-on decision means and said downshift decision means; and output means for outputting a signal to engage a first one of said frictional engagement units if the satisfaction of said engagement condition is decided by said engagement condition decision means, and wherein said one-way clutches are engaged or released as the input torques increase, to establish a downshift to said predetermined gear stage from a gear stage having a lower gear ratio than said predetermined gear stage.

6. An automatic transmission shift control apparatus according to claim 5, wherein said engagement condition decision means includes decision means for deciding the satisfaction of said condition if the ratio of rotational speeds of predetermined two members in said gear train is equal to or higher than a predetermined value.

7. An automatic transmission shift control apparatus according to claim 5, wherein said engagement condition decision means includes decision means for deciding the satisfaction of said condition if the ratio of an input rotational speed of said automatic transmission and an output rotational speed is higher by a predetermined value than the gear ratio at said predetermined gear stage.

8. An automatic transmission shift control apparatus according to claim 5, wherein said engagement condition decision means includes decision means for deciding the satisfaction of said condition if a predetermined time period elapses after a shift to said predetermined gear stage has been started.

9. A shift control apparatus for an automatic transmission including a gear train having a plurality of one-way clutches having their engagement states switched in accordance with torque applying directions and a plurality of frictional engagement units adapted to be engaged by oil pressures, said apparatus comprising:

control means for engaging a first one of said frictional engagement units so as to maintain a predetermined gear stage after any of said one-way clutches has been engaged or released, if a predetermined condition is satisfied after said one-way clutch has been engaged or released to start a shift to said predetermined gear stage;

a second frictional engagement unit adapted to be released with the engagement of said first frictional engagement unit so as to effect a shift to said predetermined gear stage;

a shift valve for feeding an oil pressure to said second frictional engagement unit and for establishing communication of an oil passage leading to said first frictional engagement unit with a drain; and a control valve disposed in said oil passage and adapted to be switched between a first state for establishing communication of said shift valve with said second frictional engagement unit, and a second state for establishing communication of said second frictional engagement unit with a drain in a manner to bypass said shift valve.

10. A shift control apparatus for an automatic transmission including a plurality of frictional engagement units having their engagements/releases controlled by oil pressures and a gear train adapted to be set to a plurality of gear stages in accordance with a combination of the engagement/releases of said frictional engagement units, said apparatus comprising:

a shift valve for simultaneously switching the feeding/releasing states of the oil pressures to and from two first and second frictional engagement units; and a control valve disposed in an oil passage leading from said shift valve to said second frictional engagement unit for controlling the feed/release of the oil pressure to and from said second frictional engagement unit;

a first solenoid valve for actuating said shift valve; and a second solenoid valve for actuating said control valve, wherein said second frictional engagement unit is a frictional engagement unit adapted to be engaged for setting a high gear stage, and wherein said first frictional engagement unit is a frictional engagement unit adapted to be engaged for setting a low gear stage having a higher gear ratio than that of said high gear stage.

11. An automatic transmission shift control apparatus according to claim 10, wherein said control valve includes: an input port adapted to be fed with an oil pressure from said shift valve; a drain port opened into a drain; and an output port adapted to communicate selectively with said input port and said drain port and connected to said second frictional engagement unit.

12. An automatic transmission shift control apparatus according to claim 10, wherein said control valve includes: a first port connected to said second frictional engagement unit; a second port adapted to communicate selectively with said first port; and a third port adapted to be disconnected from said first port, when said first port and said second port communicate, and to communicate with said first port when said first port and said second port are disconnected, and wherein said shift valve includes: a fourth port connected to said second port; a fifth port adapted to communicate with said fourth port when said predetermined gear stage is to be set; and a sixth port adapted to communicate with said fourth port when another gear stage is to be set, further comprising an oil passage connected to said sixth port and adapted to be fed with an oil pressure when another gear stage is to be set, wherein said third port is connected to said oil passage.

13. A shift control apparatus for an automatic transmission comprising:

a gear train including at least first and second frictional engagement units for execution of shift by releasing the one frictional engagement unit of the first and second frictional engagement units and engaging the other frictional engagement units; and control means for engaging the one frictional engagement unit of the first and second frictional engagement units after the release of the other frictional engagement unit of the first and second frictional engagement unit.

14. A shift control apparatus of an automatic transmission according to claim 13, wherein the gear train is set at a low gear stage under a driven state and set at a high gear stage under an undriven state in case that the two frictional engagement units are released.

15. An automatic transmission shift control apparatus according to claim 14, wherein the gear train further comprises a one-way clutch, wherein said control means includes: power-off decision means for deciding a decrease in an input torque; upshift decision means for deciding occurrence of an upshift, in which a speed ratio is decreased with a decrease in the input torque; engagement condition decision means for deciding the satisfaction of the engagement condition on the basis of the decision results of said power-off decision means and said up-shift decision means; and output means for outputting a signal to engage said first frictional engagement means if the satisfaction of said engagement condition is decided by said engagement condition decision means, and wherein said one-way clutches are engaged or released as the input torques decrease, to establish an upshift to said predetermined gear stage from a gear stage having a higher gear ratio than said predetermined gear stage.

16. An automatic transmission shift control apparatus according to claim 14, wherein said control means includes decision means for deciding the satisfaction of said condition if the ratio of rotational speeds of predetermined two members in said gear train is equal to or less than a predetermined value.

17. An automatic transmission shift control apparatus according to claim 14, wherein said control means includes decision means for deciding the satisfaction of said condition if the ratio of an input rotational speed of said automatic transmission and an output rotational speed is lower by a predetermined value than the gear ratio at said predetermined gear stage.

18. An automatic transmission shift control apparatus according to claim 15, wherein said control means includes decision means for deciding the satisfaction of said condition if a predetermined time period elapses after a shift to said predetermined gear stage has been started.

19. An automatic transmission shift control apparatus according to claim 14, wherein said control means includes: power-on decision means for deciding an increase in an input torque; downshift decision means for deciding occurrence of a downshift, in which a speed ratio is increased with an increase in the input torque; engagement condition decision means for deciding the satisfaction of the engagement condition on the basis of the decision results of said power-on decision means and said downshift decision means; and output means for outputting a signal to engage said first frictional engagement means if the satisfaction of said engagement condition is decided by said engagement condition decision means, and wherein said one-way clutches are engaged or released as the input torques increase, to establish a downshift to said predetermined gear stage from a gear stage having a lower gear ratio than said predetermined gear stage.

20. An automatic transmission shift control apparatus according to claim 19,
   wherein said condition decision means includes decision means for deciding the satisfaction of said condition if the ratio of rotational speeds of predetermined two members in said gear train is equal to or higher than a predetermined value.

21. An automatic transmission shift control apparatus according to claim 19,
   wherein said condition decision means includes decision means for deciding the satisfaction of said condition if the ratio of an input rotational speed of said automatic transmission and an output rotational speed is higher by a predetermined value than the gear ratio at said predetermined gear stage.

22. An automatic transmission shift control apparatus according to claim 19,
   wherein said condition decision means includes decision means for deciding the satisfaction of said condition if a predetermined time period elapses after a shift to said predetermined gear stage has been started.

23. An automatic transmission shift control apparatus according to claim 13, further comprising:
   a shift valve for feeding an oil pressure to said second frictional engagement unit and for establishing communication of an oil passage leading to said first frictional engagement unit with a drain; and
   a control valve disposed in said oil passage and adapted to be switched between a first state for establishing communication of said shift valve with said second frictional engagement unit, and a second state for establishing communication of said second frictional engagement unit with a engagement unit, and a second state for establishing communication of said second frictional engagement unit with a drain in a manner to bypass said shift valve,
   wherein the second frictional engagement unit is released with the engagement of said first frictional engagement unit so as to effect a shift to a predetermined gear stage.

24. A shift control apparatus for an automatic transmission including at least first and second frictional engagement units having their engagements/releases controlled by oil pressures and a gear train to be shifted by changing the one frictional engagement unit from engagement to release and the other frictional engagement unit from release to engagement, said apparatus comprising:
   a shift valve for simultaneously switching the feeding/releasing states of the oil pressures to and from two first and second frictional engagement units; and
   a control valve disposed in an oil passage leading from said shift valve to said second frictional engagement unit for controlling the feed/release of the oil pressure to and from said second frictional engagement unit.

25. An automatic transmission shift control apparatus according to claim 24,
   wherein said second frictional engagement unit is a frictional engagement unit adapted to be engaged for setting a high gear stage, and
   wherein said first frictional engagement unit is a frictional engagement unit adapted to be engaged for setting a low gear stage having a higher gear ratio than that of said high gear stage.

26. An automatic transmission shift control apparatus according to claim 24, further comprising:
   a first solenoid valve for actuating said shift valve; and
   a second solenoid valve for actuating said control valve.

27. An automatic transmission shift control apparatus according to claim 24,
   wherein said control valve includes: an input port adapted to be fed with an oil pressure from said shift valve; a drain port opened into a drain; and an output port adapted to communicate selectively with said input port and said drain port and connected to said second frictional engagement unit.

28. An automatic transmission shift control apparatus according to claim 24,
   wherein said control valve includes: a first port connected to said second frictional engagement unit; a second port adapted to communicate selectively with said first port; and a third port adapted to be disconnected from said first port when said first port and said second port communicate, and to communicate with said first port when said first port and said second port are disconnected, and
   wherein said shift valve includes: a fourth port connected to said second port; a fifth port adapted to communicate with said fourth port when said predetermined gear stage is to be set; and a sixth port adapted to communicate with said fourth port when another gear stage is to be set,
   further comprising an oil passage connected to said sixth port and adapted to be fed with an oil pressure when another gear stage is to be set,
   wherein said third port is connected to said oil passage.

* * * * *

UNITED STATES PATENT AND TRADEMARK OFFICE
CERTIFICATE OF CORRECTION

PATENT NO. : 5,235,877
DATED : AUGUST 17, 1993
INVENTOR(S) : Tokuyuki TAKAHASHI et al.

It is certified that error appears in the above-indentified patent and that said Letters Patent is hereby corrected as shown below:

Column 20, line 56, change "second" to --first--;

line 59, change "first" to --second--.

Signed and Sealed this

Twenty-sixth Day of April, 1994

*Attest:*

BRUCE LEHMAN

*Attesting Officer*  *Commissioner of Patents and Trademarks*